US010294403B2

(12) United States Patent
Hall et al.

(10) Patent No.: US 10,294,403 B2
(45) Date of Patent: May 21, 2019

(54) ADDITIVE OF CHEMICALLY-MODIFIED CELLULOSE NANOFIBRILS OR CELLULOSE NANOCRYSTALS

(71) Applicant: Halliburton Energy Services, Inc., Houston, TX (US)

(72) Inventors: Lee J. Hall, The Woodlands, TX (US); Jay P. Deville, Spring, TX (US); Orlando J. Rojas, Cary, NC (US); Carlos A. Carrillo, Raleigh, NC (US); Carlos L. Salas, Raleigh, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/519,793

(22) PCT Filed: Dec. 19, 2014

(86) PCT No.: PCT/US2014/071390
§ 371 (c)(1),
(2) Date: Apr. 17, 2017

(87) PCT Pub. No.: WO2016/099537
PCT Pub. Date: Jun. 23, 2016

(65) Prior Publication Data
US 2017/0253786 A1    Sep. 7, 2017

(51) Int. Cl.
*C09K 8/10* (2006.01)
*C04B 24/38* (2006.01)
(Continued)

(52) U.S. Cl.
CPC .............. *C09K 8/10* (2013.01); *C04B 24/383* (2013.01); *C04B 28/04* (2013.01); *C09K 8/035* (2013.01);
(Continued)

(58) Field of Classification Search
CPC .... C09K 8/10; C09K 2208/08; C04B 24/383; C04B 28/04; E21B 21/003; E21B 33/13; E21B 43/25
See application file for complete search history.

(56) References Cited

U.S. PATENT DOCUMENTS 4,296,811 A   10/1981  Morris et al.
6,348,436 B1 * 2/2002  Langlois .................. B82Y 5/00
                                              507/104
(Continued)

FOREIGN PATENT DOCUMENTS

WO    2011089323 A1    7/2011
WO    2014085729 A1    6/2014

OTHER PUBLICATIONS

International Search Report and Written Opinion dated Sep. 14, 2015; International PCT Application No. PCT/US2014/071390.

*Primary Examiner* — Zakiya W Bates
*Assistant Examiner* — Crystal J Miller
(74) *Attorney, Agent, or Firm* — McGuireWoods LLP

(57) ABSTRACT

A wellbore treatment fluid comprising: a base fluid; and additive comprising a first polymer bundle selected from the group consisting of cellulose nanofibrils, cellulose nanocrystals, and combinations thereof, wherein one or more functional groups of the first polymer are chemically modified A method of treating a portion of a wellbore comprising: introducing the treatment fluid into the wellbore.

17 Claims, 23 Drawing Sheets

(51) Int. Cl.
*C09K 8/035* (2006.01)
*C09K 8/90* (2006.01)
*E21B 21/00* (2006.01)
*C09K 8/40* (2006.01)
*C09K 8/70* (2006.01)
*C09K 8/92* (2006.01)
*C04B 28/04* (2006.01)
*C09K 8/42* (2006.01)
*E21B 33/13* (2006.01)
*E21B 43/25* (2006.01)
*E21B 21/06* (2006.01)

(52) U.S. Cl.
CPC .................. *C09K 8/40* (2013.01); *C09K 8/42* (2013.01); *C09K 8/70* (2013.01); *C09K 8/90* (2013.01); *C09K 8/92* (2013.01); *E21B 21/003* (2013.01); *E21B 33/13* (2013.01); *E21B 43/25* (2013.01); *C09K 2208/08* (2013.01); *C09K 2208/10* (2013.01); *E21B 21/062* (2013.01)

(56) References Cited

U.S. PATENT DOCUMENTS

| | | | |
|---|---|---|---|
| 9,133,384 | B2 | 9/2015 | Rincon-Torres et al. |
| 9,200,193 | B2* | 12/2015 | Laukkanen ............... C09K 8/40 |
| 9,469,802 | B2 | 10/2016 | Hall |
| 2011/0036522 | A1 | 2/2011 | Ankerfors et al. |
| 2012/0015852 | A1 | 1/2012 | Quintero et al. |
| 2013/0035263 | A1* | 2/2013 | Laukkanen ............... C09K 8/40 |
| | | | 507/112 |
| 2013/0196883 | A1* | 8/2013 | Rincon-Torres ......... C09K 8/70 |
| | | | 507/112 |
| 2013/0274149 | A1* | 10/2013 | Lafitte .................... C09K 8/905 |
| | | | 507/112 |
| 2014/0153353 | A1* | 6/2014 | Koskinen ................ B28C 5/026 |
| | | | 366/3 |
| 2015/0072902 | A1* | 3/2015 | Lafitte .................... C09K 8/035 |
| | | | 507/112 |
| 2016/0160113 | A1* | 6/2016 | Nguyen ................... C09K 8/04 |
| | | | 175/65 |
| 2017/0002256 | A1 | 1/2017 | Hall |
| 2017/0240792 | A1* | 8/2017 | Monclin ................... C09K 8/32 |

* cited by examiner

US 10,294,403 B2

ADDITIVE OF CHEMICALLY-MODIFIED CELLULOSE NANOFIBRILS OR CELLULOSE NANOCRYSTALS

TECHNICAL FIELD

Polymer additives can be used in a variety of wellbore operations. The additive can perform a variety of functions including a viscosifier, a cement additive, a fluid loss control additive, and a rheology modifier. The additive can be made of chemically-modified cellulose nanofibrils or cellulose nanocrystals.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE INVENTION

Figure 1:
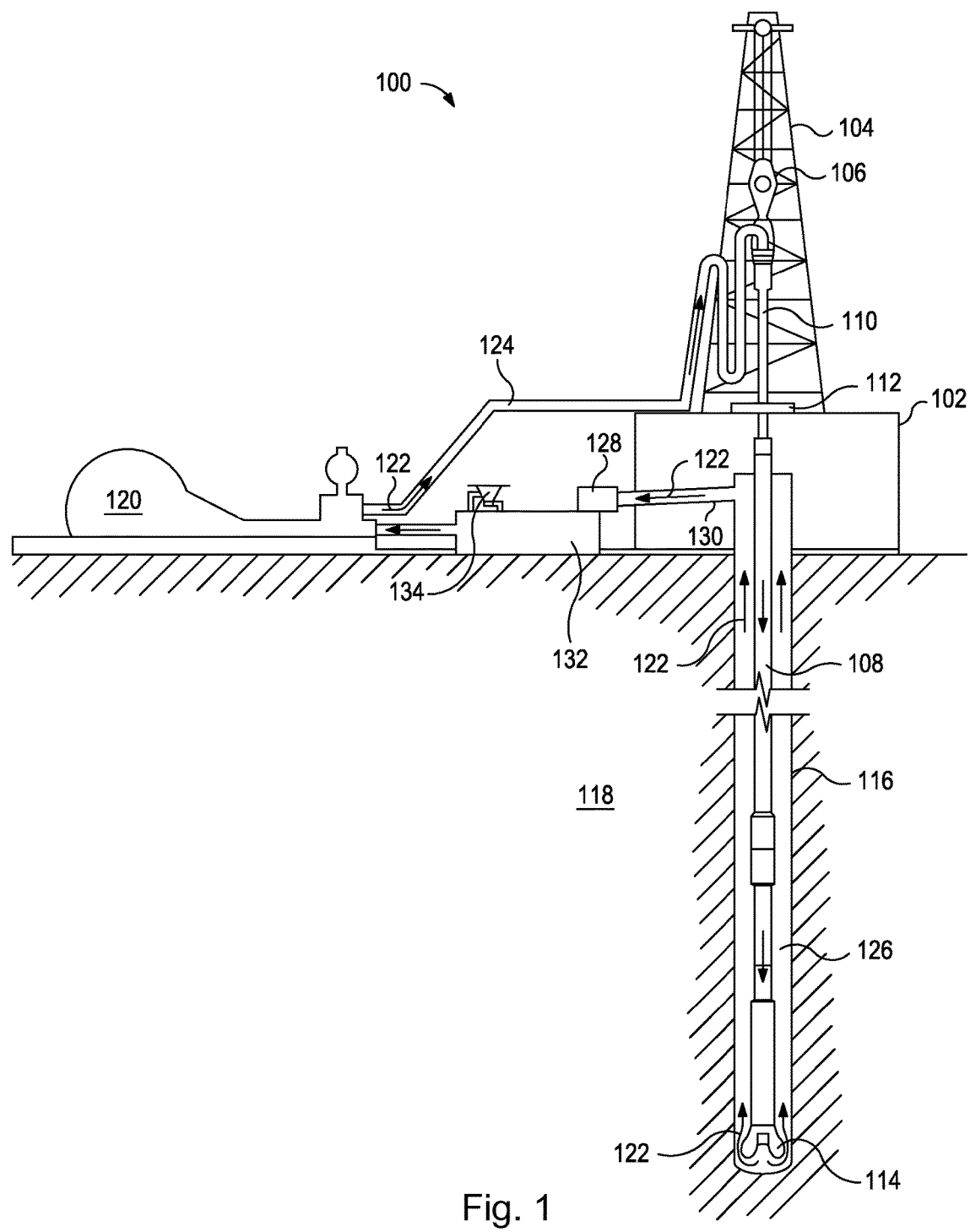
FIG. 1 is a diagram illustrating a well system according to certain embodiments.
Figure 2A:
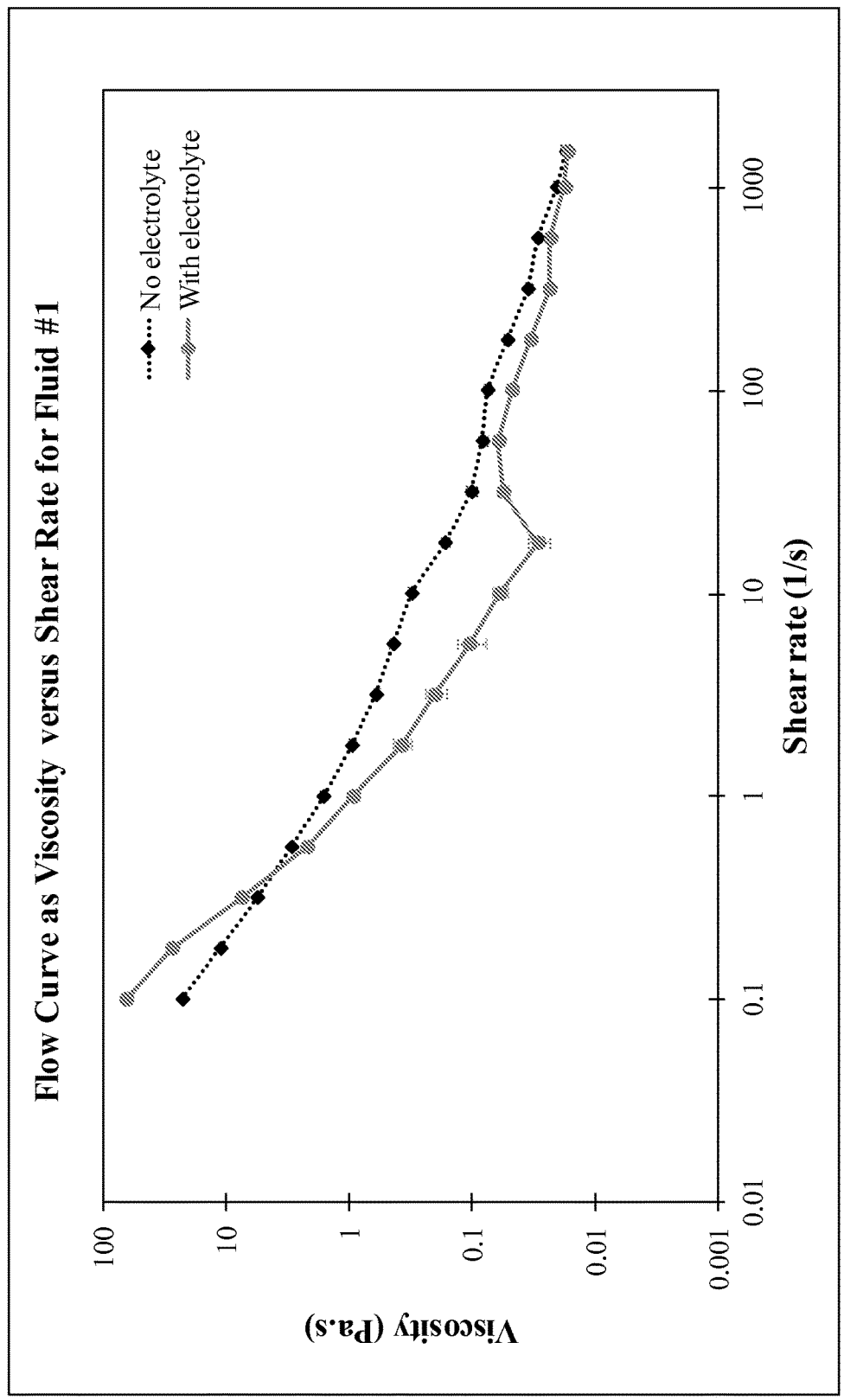
FIGS. 2A-2D are graphs of a Flow Curve as viscosity (Pascal*seconds) versus shear rate ($sec^{-1}$) for 8 different fluids in freshwater and an electrolyte with various modifications.
Figure 2B:
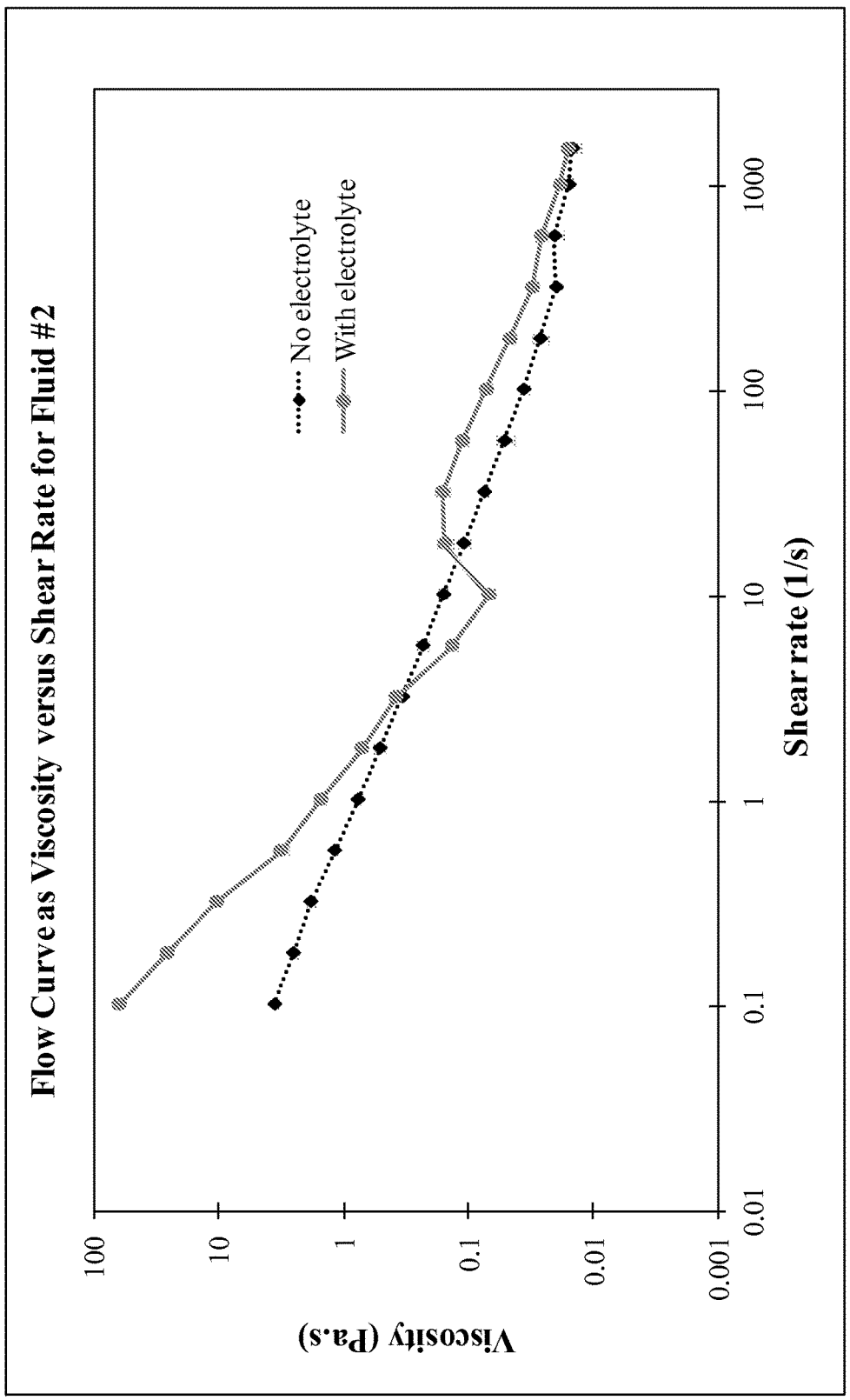
Figure 2C:
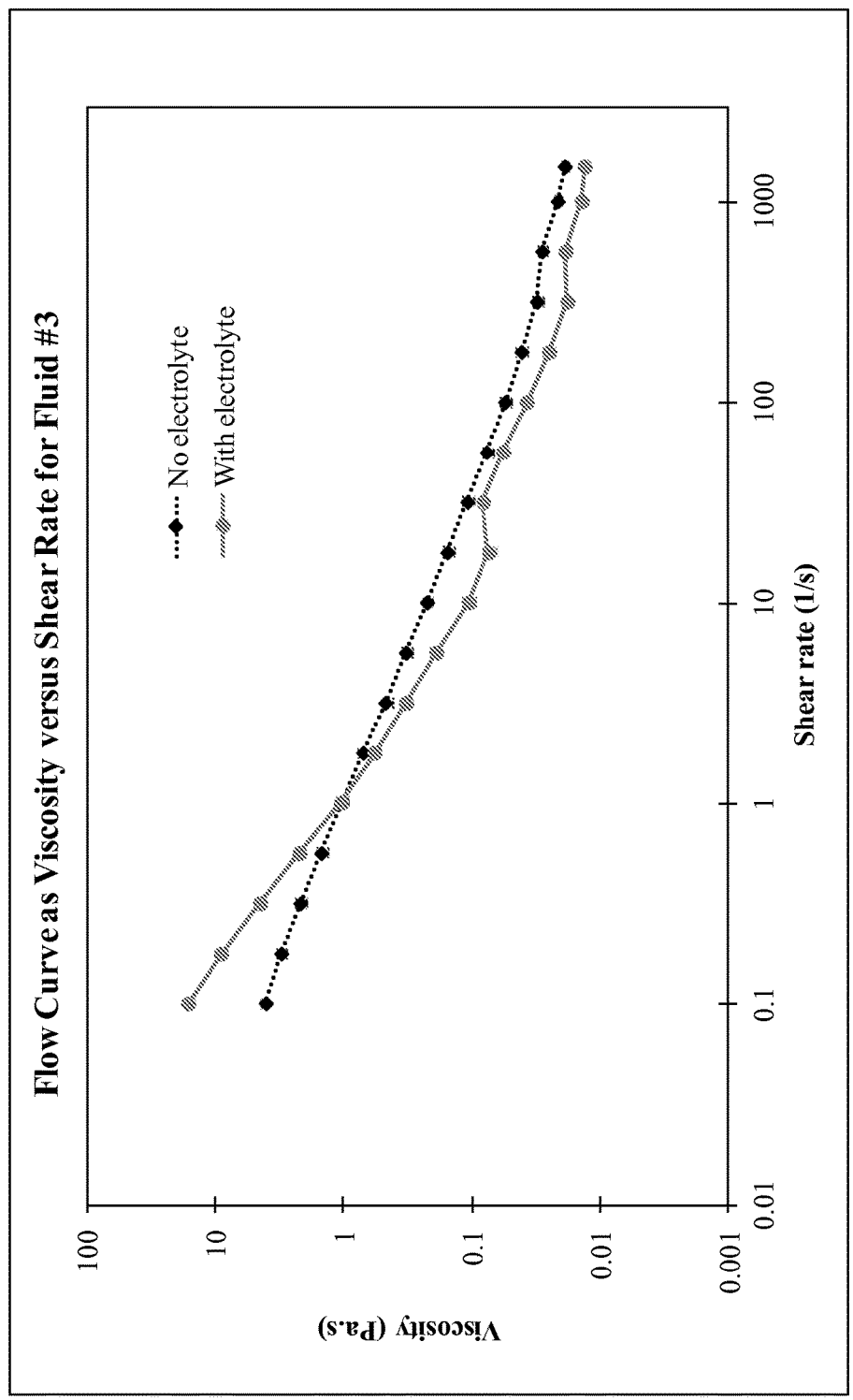
Figure 2D:
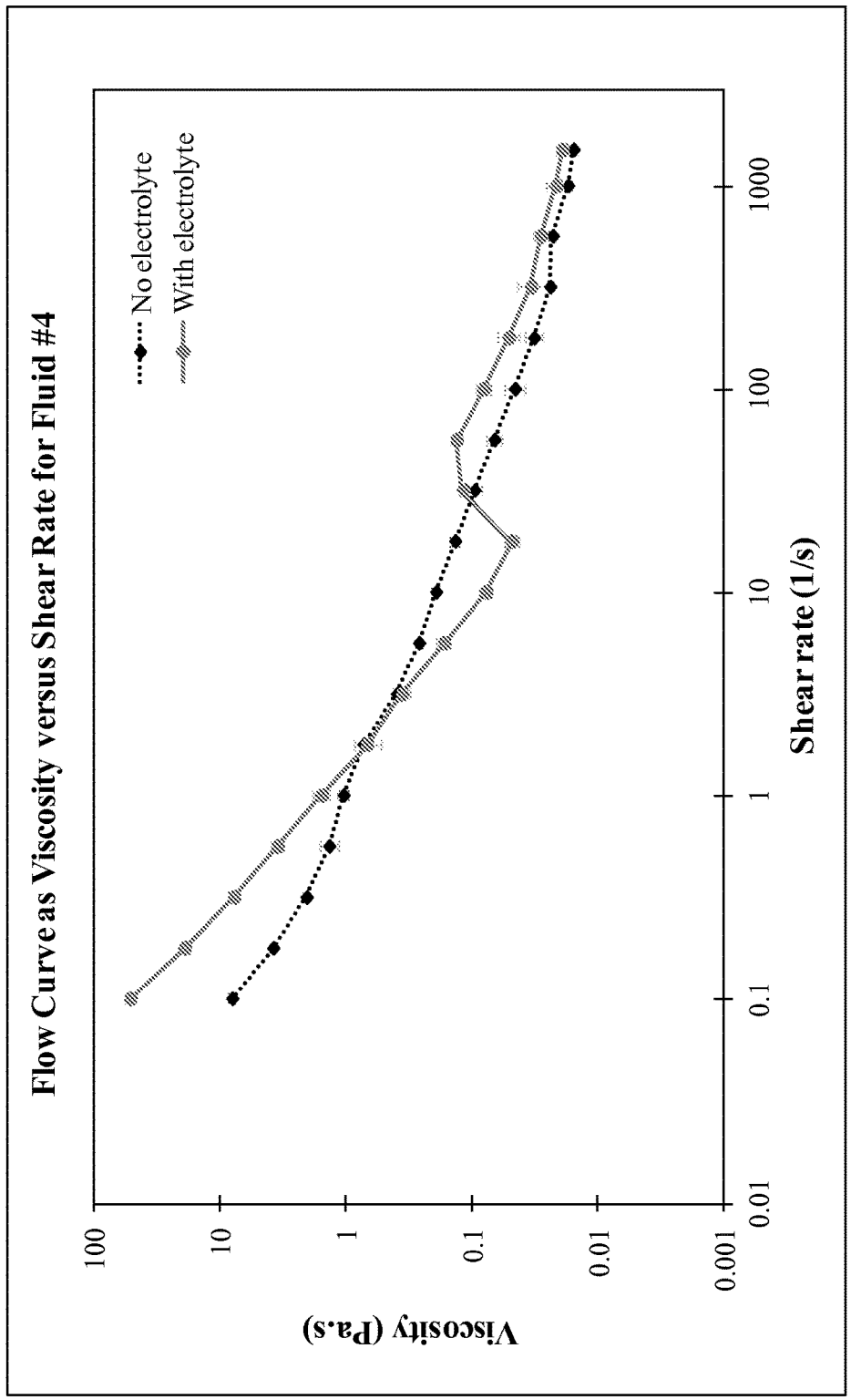
Figure 3A:
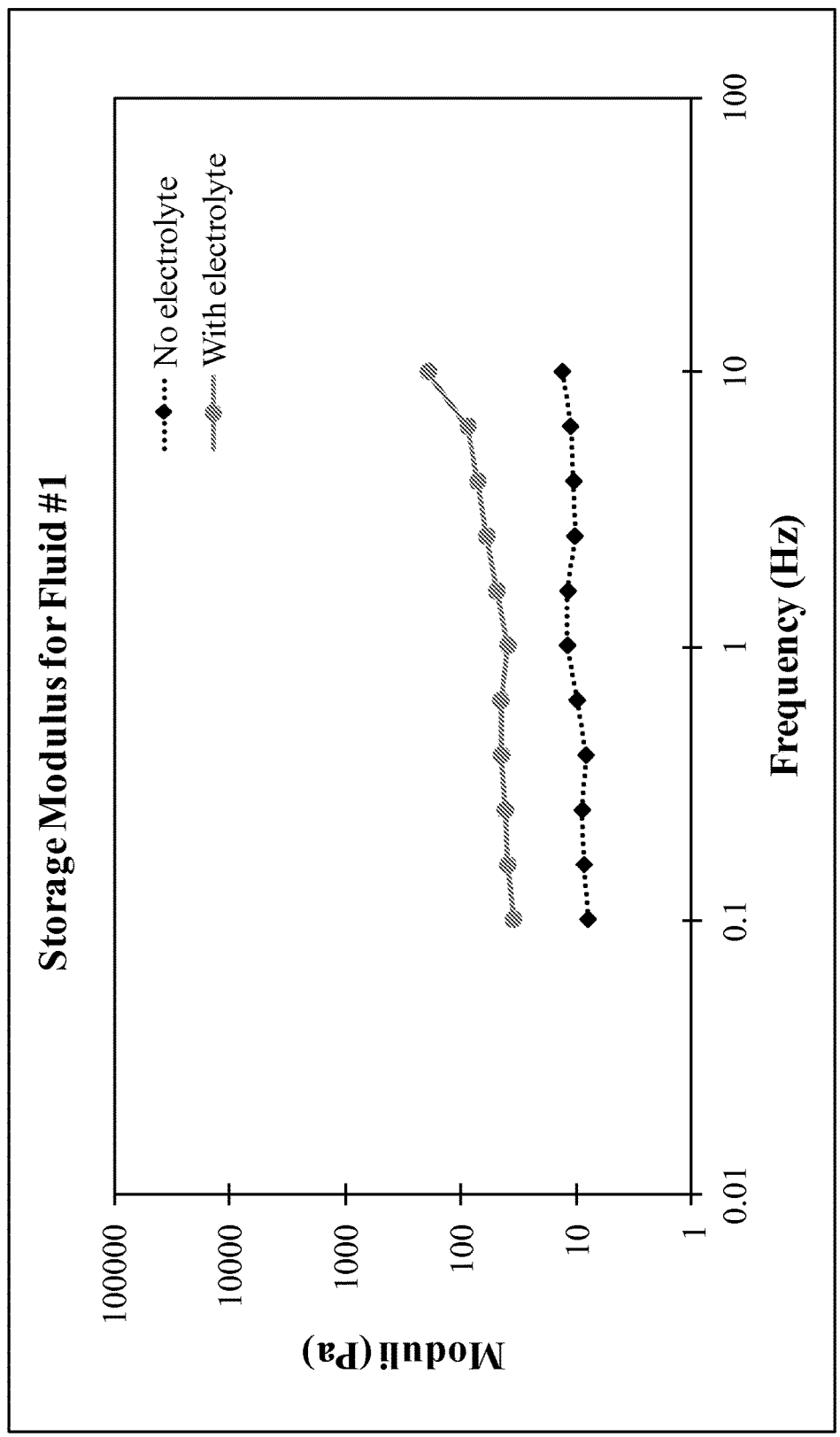
FIGS. 3A-3D are graphs of the storage modulus for the fluids from FIGS. 2A-2D.
Figure 3B:
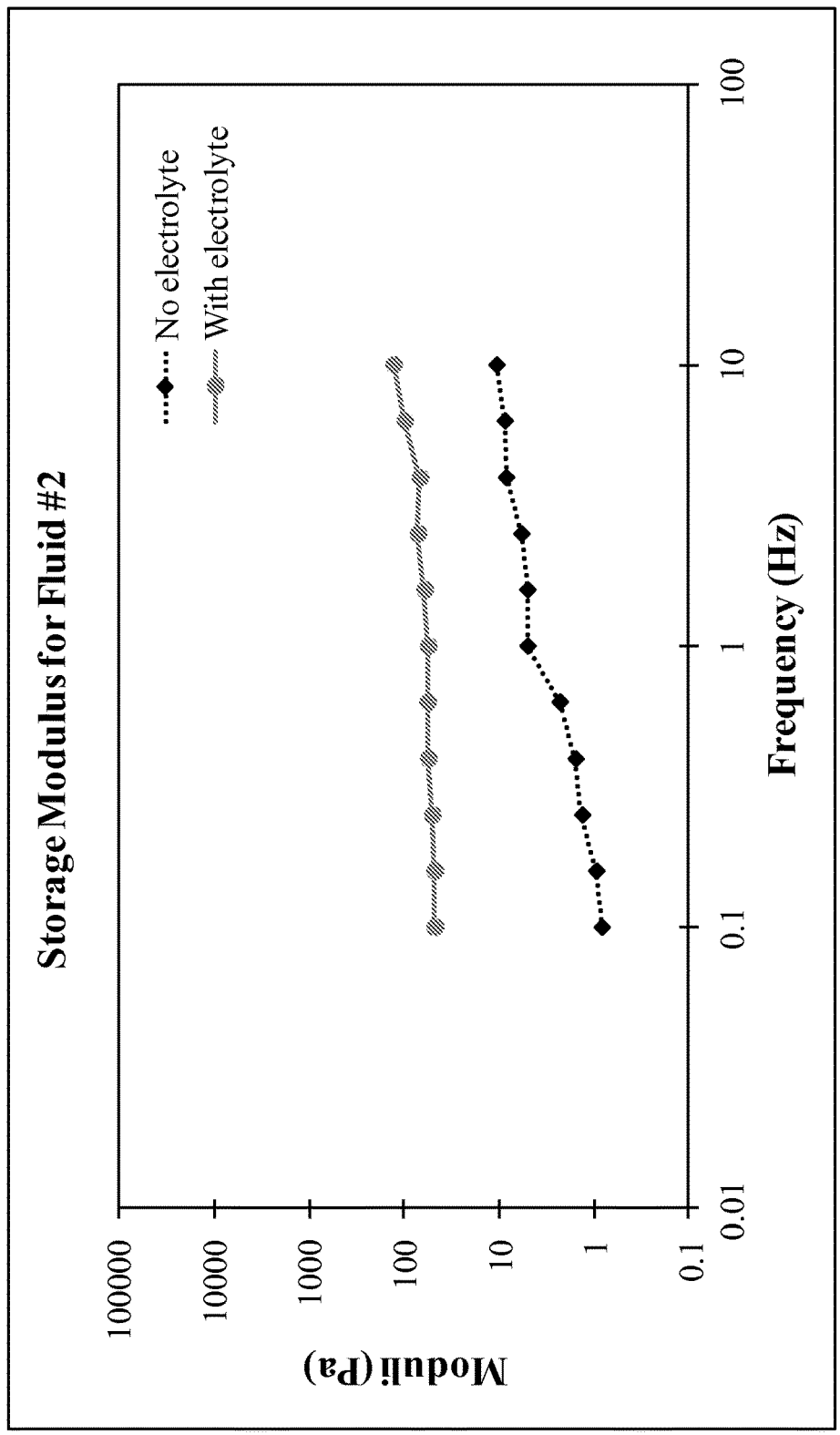
Figure 3C:
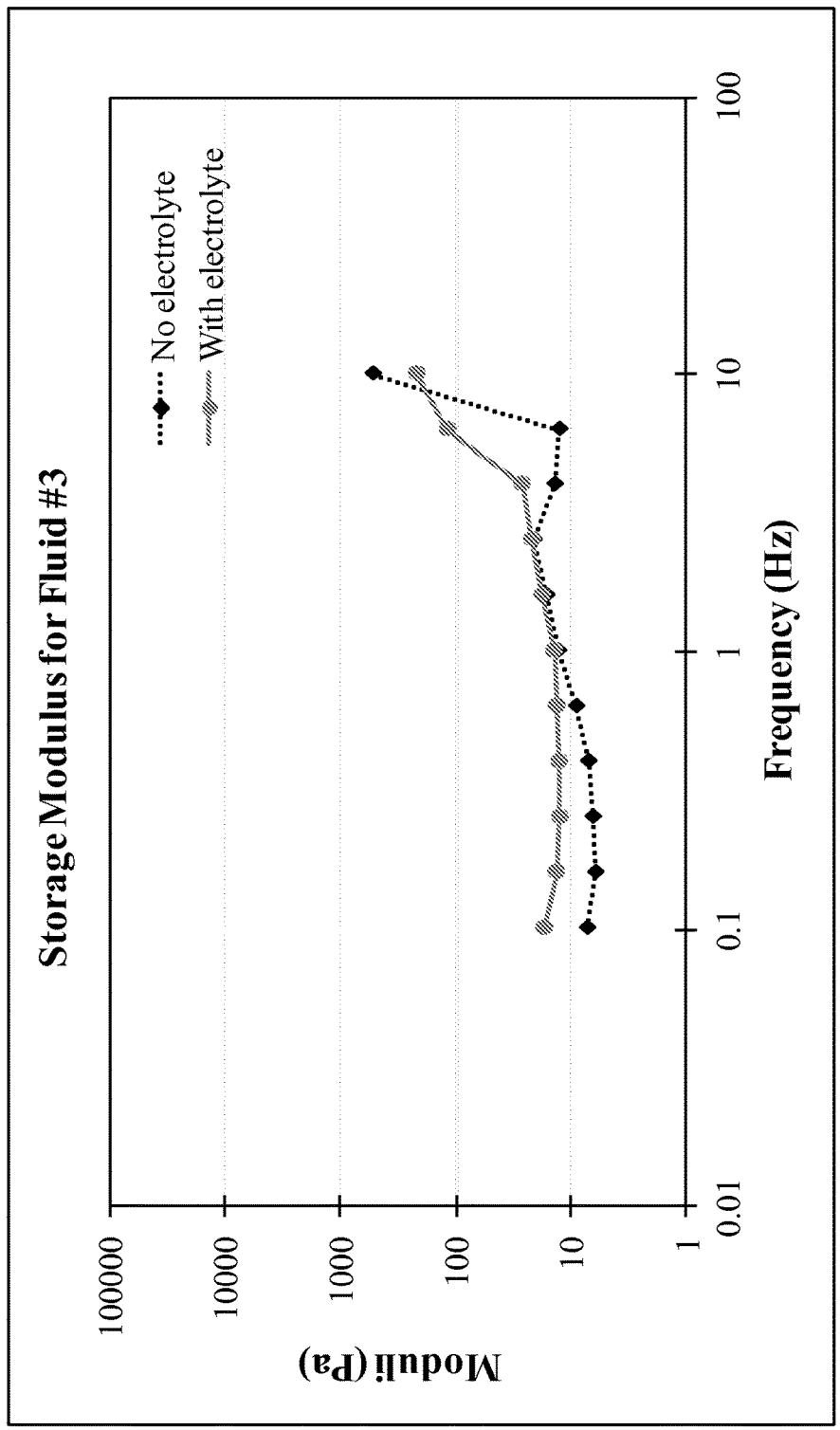
Figure 3D:
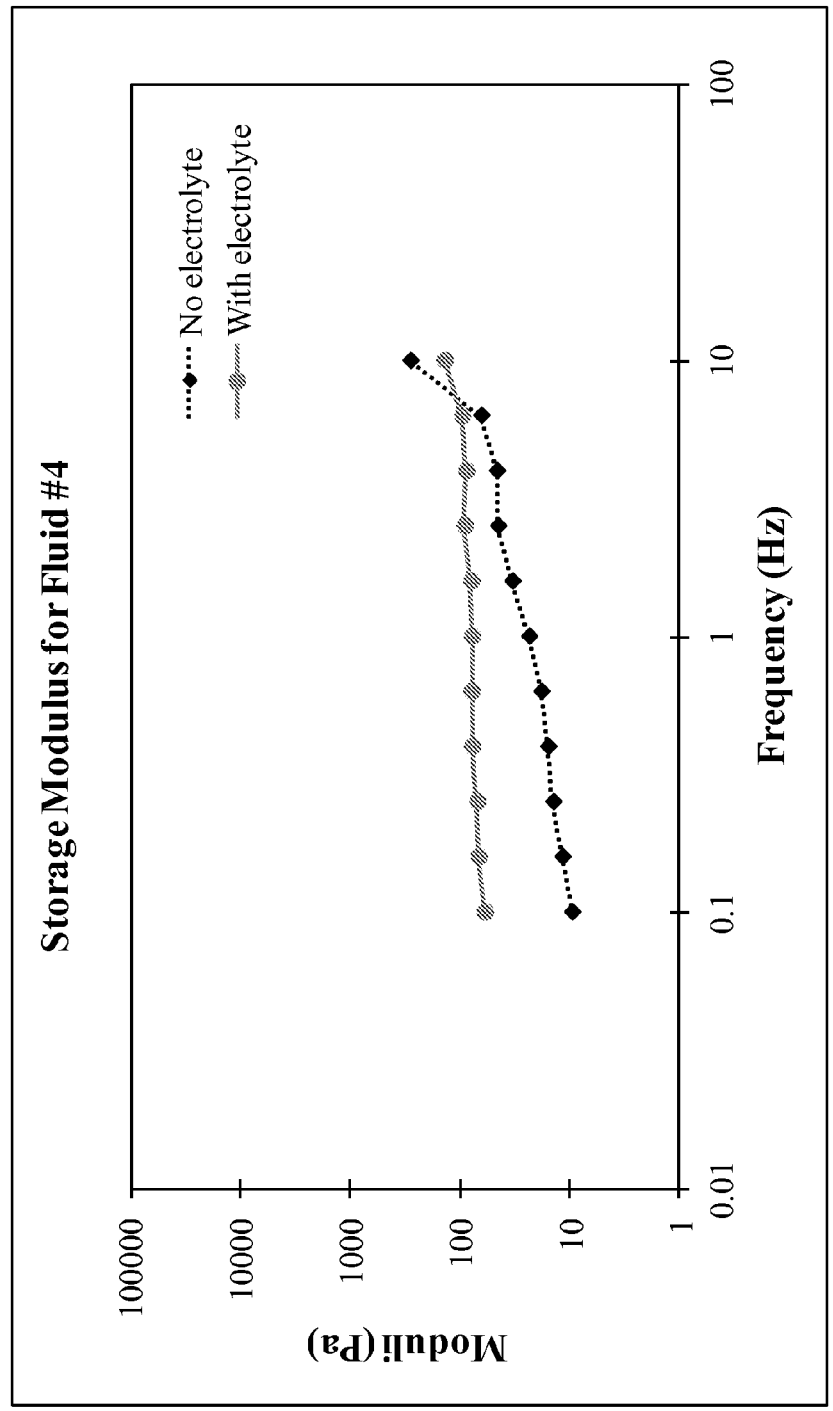

Oil and gas hydrocarbons are naturally occurring in some subterranean formations. In the oil and gas industry, a subterranean formation containing oil and/or gas is referred to as a reservoir. A reservoir can be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megaPascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a well" means and includes into any portion of the well, including into the wellbore or into the near-wellbore region via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A treatment fluid can be used to treat a portion of a wellbore. Examples of common treatment fluids include, but are not limited to, drilling fluids, spacer fluids, cement compositions, completion fluids, stimulation fluids (e.g., fracturing fluids), and work-over fluids. As used herein, a "treatment fluid" is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

Additives can be used in treatment fluids. Additives can be used as a viscosifier, rheology modifier, gelling agent, and fluid loss control additive. There exists a need for improved additives that provide desirable fluid properties while being thermally stable. It has been discovered that chemical modification of cellulose nanofibrils or nanocrystals can be used as an additive for oil and gas fluids.

The cellulose nanofibrils or nanocrystals can be a polymer bundle. A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer.

In a copolymer, the repeating units from each of the monomer residues can be arranged in various manners along the polymer chain. For example, the repeating units can be random, alternating, periodic, or block. As used herein, a "polymer" can include a cross-linked polymer. As used herein, a "cross link" or "cross linking" is a connection between two or more polymer molecules. A cross-link between two or more polymer molecules can be formed by a direct interaction between the polymer molecules, or conventionally, by using a cross-linking agent that reacts with the polymer molecules to link the polymer molecules. A second polymer can also be grafted onto the backbone of a first polymer.

If any laboratory test (e.g., rheology or fluid loss) requires the step of mixing, then the treatment fluid is mixed according to the following procedures. A known volume (in units of barrels) of the base fluid is added to a mixing container and the container is then placed on a mixer base. The motor of the base is then turned on and maintained at 10,000 to 12,000 revolutions per minute (rpm). The additives are then added to the base fluid and mixed for at least 2 minutes. The additives can be added at a stated concentration of weight by volume of the base fluid, for example, in units of pounds per barrel of the drilling fluid. It is to be understood that any mixing is performed at ambient temperature and pressure—about 71° F. (22° C.) and about 1 atm (0.1 MPa).

It is also to be understood that if any laboratory test (e.g., rheology or fluid loss) requires the test be performed at a specified temperature and possibly a specified pressure, then the temperature and pressure of the drilling fluid is ramped up to the specified temperature and pressure after being mixed at ambient temperature and pressure. For example, the treatment fluid can be mixed at 71° F. (22° C.) and 1 atm (0.1 MPa) and then placed into the testing apparatus and the temperature of the treatment fluid can be ramped up to the specified temperature. As used herein, the rate of ramping up the temperature is in the range of about 3° F./min to about 5° F./min (about 1.67° C./min to about 2.78° C./min) to simulate actual wellbore conditions. After the treatment fluid is ramped up to the specified temperature and possibly pressure, the fluid is maintained at that temperature and pressure for the duration of the testing.

A fluid should exhibit good rheology. Rheology is a measure of how a material deforms and flows under stress. As used herein, the "rheology" of a fluid is measured as follows. The fluid is mixed and placed into the rheometer. All the rheometric measurements were carried out using an AR-2000 rheometer from TA instruments. The geometry used parallel plates with a gap of 1 millimeter "mm." For oscillatory tests, the stress was kept constant at 0.5 Pascal "Pa," and for oscillatory temperature scans, the stress was kept constant at 0.5 Pascal "Pa" and the frequency at 0.5 Hertz "Hz." The Herschel-Bulkley model was applied to the experimental data according to the following equation:

$$\tau = \tau_0 + k * \gamma^n$$

where $\tau$=shear stress; $\tau_0$=yield stress; k=viscosity index; $\gamma$=shear rate; and n=flow index. The yield stress ($\tau_0$) is the stress that must be applied to a material to make it begin to flow (or yield), and may commonly be calculated from rheometer readings measured at rates of 3, 6, 100, 200, 300 and 600 rpm. The extrapolation in this case may be performed by applying a least-squares fit or curve fit to the Herchel-Bulkley rheological model. The shear rate ($\gamma$) is the rate at which a progressive shearing deformation is applied to the material and can be calculated, in the case or parallel plate geometries, as the velocity of the moving plates divided by the distance between the 2 parallel plates. A flow index (n) of less than 1 indicates the fluid has shear thinning behavior; whereas a flow index greater than 1 indicates the fluid has shear thickening behavior.

Viscosity is a measure of how resistant a material is to shear forces and to flow freely. A viscous material (e.g., honey) resists flow; while a less viscous material (e.g., freshwater) flows freely. The apparent viscosity ($\eta$) is calculated at a given shear rate, in the present case of 0.01 sec$^{-1}$ as $\tau/\gamma$ and reported in units of Pa*sec.

A fluid can develop gel strength. One way to determine the gelation of a fluid is to measure the elastic modulus and loss modulus of the fluid. Storage modulus (G') is a measure of the tendency of a substance to be deformed elastically (i.e., non-permanently) when a force is applied to it and returned to its normal shape. Storage modulus is expressed in units of pressure, for example, Pa or dynes/cm². Loss modulus (G") is a measure of the energy lost when a substance is deformed. G" is also expressed in units of pressure, for example, Pa or dynes/cm². When comparing G' to G" the units of both G' and G" should be the same.

As used herein, the storage modulus (G') and loss modulus (G") are determined as follows using an advanced rheometer such as a TA Instruments AR-2000 or similar with parallel plates geometry. The treatment fluid is mixed and then placed into the rheometer. The treatment fluid is tested at a specified temperature and ambient pressure (1 atmosphere). The upper plate is oscillated at a constant stress of 0.5 Pa. The temperature is held constant at 77° F. (25° C.). For the oscillatory temperature scans, the temperature is increased from 77° F. (25° C.) to 158° F. (70° C.) and then the fluid is cooled down back to 77° F. (25° C.). If both G'>G" and G'>1 Pa at at least one point over a range of points from about 0.01 Hz to about 10 Hz at a given temperature, then the fluid is considered to be viscoelastic at that temperature. A fluid is considered to be viscoelastic if at least one of the above tests is satisfied.

Thermogravimetric analysis can be performed to determine the thermal stability and the amount of decomposition of a substance due to heat. As used herein, a "thermal profile" is performed using thermogravimetric analysis as follows. A known amount of a substance is placed into a TGA instrument with heating capacity and a balance to weigh the sample. The sample is started at 100 weight % at a particular temperature. The substance is then heated to a final temperature, with weight % readings taken during the course of the temperature increase. The weight % of the sample is plotted against the temperature to produce the thermal profile of the substance. The graph can be used to determine in what temperature range the substance is thermally stable. As used herein, a substance is considered "thermally stable" up to the degradation temperature of the substance (i.e., the temperature at which the onset of degradation begins). By way of example, a substance may begin degrading, indicated by a decline in weight %, at a temperature of 150° F. (66° C.), which means that the substance is thermally stable at temperatures less than and equal to 150° F. (66° C.).

Another desirable property of a treatment fluid is low fluid loss. As used herein, the "fluid loss" of a fluid is tested at a specified temperature and pressure differential as follows. The fluid is mixed. The drilling fluid is poured into a filter cell. The testing apparatus is assembled with a filter paper inserted into the apparatus. The specified pressure differential is set. A timer is started and filtrate out of the testing apparatus is collected in a separate pre-weighed container. The testing is performed for 30 min. The total weight in grams (g) of the filtrate collected is recorded over the 30 min. Generally, a fluid with a filtrate of less than about 2 g in 30 min is considered low or acceptable fluid loss.

According to certain embodiments, a wellbore treatment fluid comprises: a base fluid; and an additive comprising a first polymer bundle selected from the group consisting of cellulose nanofibrils, cellulose nanocrystals, and combinations thereof, wherein one or more functional groups of the first polymer bundle are chemically modified.

According to certain other embodiments, a method of treating a portion of a wellbore comprises: introducing the treatment fluid into the wellbore.

It is to be understood that the discussion of preferred embodiments regarding the treatment fluid or any ingredient in the treatment fluid (e.g., the first polymer bundle) are intended to apply to the method, treatment fluid, and system embodiments. Any reference to the unit "gallons" means U.S. gallons.

The treatment fluid includes a base fluid. The treatment fluid can be a heterogeneous fluid, wherein the base fluid is the continuous phase. Any of the phases of a heterogeneous fluid can include dissolved substances or undissolved solids. The base fluid can include water. The water can be selected from the group consisting of freshwater, saltwater, sea water, brackish water, and combinations thereof. According to certain embodiments, the base fluid comprises an electrolyte. As used herein, an "electrolyte" is any substance that is formed by the ionic bonding of two oppositely charged ions which are able to dissociate in water or another solvent, forming free ions (i.e., a positive- or negative-electrically charged atom or group of atoms) and making the substance electrically conductive. The electrolyte can be selected from the group consisting of salts, acid or base solutions, acid precursors, and combinations thereof. A salt can be dissolved in water, for example, to create a salt solution. Common free ions in an electrolyte include sodium ($Na^!$), potassium ($K^!$), calcium ($Ca^{2+}$), barium ($Ba^{+2}$), magnesium ($Mg^{2+}$), chloride ($Cl^-$), hydrogen phosphate ($HPO_4^{2-}$), and hydrogen carbonate ($HCO_3^-$). By way of example, the base fluid can contain a water-soluble salt. Examples of water-soluble salts include, but are not limited to, sodium chloride, calcium chloride, barium chloride, potassium chloride, magnesium chloride, potassium acetate, sodium formate, potassium formate, cesium formate, sodium bromide, potassium bromide, zinc bromide, magnesium sulfate, and combinations thereof.

The treatment fluid can be, without limitation, a drilling fluid, a drill-in fluid, a packer fluid, a completion fluid, a spacer fluid, a work-over fluid, an insulating fluid, a cement composition, or a stimulation fluid (e.g., a fracturing fluid). The treatment fluid can be introduced into the well prior to or after a second treatment fluid. As used herein, a "cement composition" is a mixture of at least cement and water (i.e., the base fluid) and possibly additives. As used herein, the term "cement" means an initially dry substance that, in the presence of water, acts as a binder to bind other materials together. An example of cement is Portland cement.

The treatment fluid can have a density greater than or equal to 9 pounds per gallon "ppg" (1.08 kilograms per liter "kg/L").

The treatment fluid also includes an additive. The additive includes a first polymer bundle selected from the group consisting of cellulose nanofibrils, cellulose nanocrystals, and combinations thereof. Cellulose is the most abundant biopolymer on earth. It is natural, renewable, and biodegradable. It is naturally synthesized by plants as well as by some specialized bacteria. Its molecular structure is constituted by a linear backbone of β-1, 4-O-glycosyl linked D-glucose residues bundled up in a nano- or micro-fiber. The cellulose nano- or micro-fiber varies in length depending on the cellulose species.

Once synthesized, the cellulose nano- or micro-fiber contains a crystalline part, which is highly insoluble in water, and some non-crystalline parts, which have been referred to as amorphous or para-crystalline cellulose. The cellulose nano- or micro-fibers are able to make a strong network, which is believed to be based on inter-molecular hydrogen bonding. However, in its most common natural state, cellulose nano- or micro-fibers show an amorphous region. The amorphous region of the cellulose nano- or micro-fibers interacts strongly with water.

Cellulose nanofibrils "CNF," which are fibrils containing both amorphous and crystalline domains of cellulose, can be produced by mechanical deconstruction of fibers assisted or not assisted by enzymatic or chemical pre-treatments. The length of the nanofibrils varies in the range from less than 1 micron (1,000 nm) to several micrometers. The width of the nanofibrils varies in the range of about tens of nm to about 100 nm. The ordered domains of cellulose, in the form of cellulose nanocrystals "CNC," can be isolated by simple acid hydrolysis of cellulose fibers to yield stiff and high strength nanocrystals with unusual mechanical, optical, and assembly properties.

Some of the advantages to cellulose nanofibrils and nanocrystals include: their highly-ordered structures provide improved mechanical, thermal, and chemical stability over conventional bulk cellulose (either as fibers or as water-soluble derivatives); their surfaces contain primary and secondary hydroxyl groups, which make them readily dispersible in water, yielding fluids with shear thinning rheology and thixotropy at relatively low concentrations; and the surface chemistry of cellulose also makes it an ideal point of attachment for further chemistry to enhance dispersion in oil or brines, or to form gels or films via specific and non-specific interactions as well as short-range hydrogen bonding.

One or more functional groups of the first polymer bundle are chemically modified. The one or more functional groups can be on the surface or near surface of the cellulose nanofibrils or nanocrystals. The first polymer bundle can form the backbone of the modified polymer bundle. The one or more functional groups can include primary or secondary alcohols of the first polymer bundle. The chemical modification can be selected from the group consisting of oxidation, carboxylation, carboxymethylation, addition of cationic functional groups, grafting of a second polymer onto the first polymer bundle, and combinations thereof. The chemical modification can create a negative or positive surface charge of the modified polymer bundle. By way of example, the surface charge of the chemically-modified polymer bundle can be in the range of about 50 to about 226 microequivalents per gram (μeq/g) of the polymer bundle.

The first polymer bundle can be chemically modified by oxidation (i.e., by the addition of a molecule with an oxygen atom) or addition of a carboxylic functional group, carboxymethyl functional group, quaternary amine functional group, or a second polymer. The second polymer can be chemically grafted onto the first polymer bundle and can be selected from the group consisting of cationic cellulose nanofibrils; substituted methyl cellulose; chitosan; chitin; cationic polyelectrolytes containing primary, secondary, tertiary or quaternary amino groups, including cationic polyacrylamides (CPAMs), cationic starch, poly(diallyldimethyl ammonium chloride), or epichlorohydrin/dimethylamine polymers; nonionic or anionic polymers, including polyethylene glycol or lignins; and combinations thereof.

The chemically-modified first polymer bundle can provide improved properties of the additive and treatment fluid. By way of example, the additive can provide a gelled fluid. The additive can provide a shear thinning behavior and low fluid loss. The additive can be, for example, a viscosifier or gelling agent, a rheology modifier, or a fluid loss control additive. The additive can also provide an increased thermal stability compared to other cellulose additives and even compared to an unmodified first polymer. The additive can have a thermal stability up to about 600° F. (316° C.).

The amount of modification (degree of substitution and/or oxidation) can have an effect on the properties of the treatment fluid. For example, an increased modification may increase the viscosity of the treatment fluid. The degree of substitution of the first polymer can be up to three. The amount of modification can also be selected such that the treatment fluid has a desired property.

The type of chemical modification (e.g., oxidation or carboxymethylation) can also affect the properties of the treatment fluid. According to certain embodiments, the type of chemical modification is selected to provide the desired properties to the treatment fluid.

The concentration of the additive can also affect the properties of the treatment fluid. The concentration of the additive can be selected to provide the desired properties to the treatment fluid. The additive can also be in a concentration in the range of about 0.1% to about 5% by weight of the base fluid.

The type of electrolyte and the concentration of the electrolyte (i.e., the total number of free ions available in the electrolyte) can also affect the properties of the treatment fluid. According to certain embodiments, the type of electrolyte (e.g., calcium chloride or sodium chloride) and the concentration of the electrolyte are selected to provide the desired properties to the treatment fluid. The electrolyte (e.g., a water-soluble salt) can be in a concentration in the range of about 1 millimolar "mM" to about 6 molar "M" in the base fluid.

The treatment fluid can have a fluid loss less than 5 grams (g) in 30 minutes (min) or less than 2 g in 30 min at a pressure differential of 100 psi.

The treatment fluid can have a viscosity less than or equal to a viscosity necessary to provide a pumpable fluid.

The treatment fluid can further include other additives. The other additive can be any additive commonly used in treatment fluids for the wellbore operation to be performed (e.g., a drilling fluid versus a work-over fluid). Examples of other additives include, but are not limited to, a weighting agent, a bridging agent, a friction reducer, a defoaming agent, elastomers, a mechanical property enhancing additive, a lost-circulation material, a filtration-control additive, a gas migration control additive, a thixotropic additive, a cement set retarder, a cement set accelerator, and combinations thereof.

The methods can further include providing the treatment fluid. The methods can further include forming the treatment fluid. The step of forming can include mixing the ingredients of the treatment fluid together using a suitable mixing apparatus. The treatment fluid can be in a pumpable state before and during introduction into the wellbore.

The methods can further include introducing a second treatment fluid into the wellbore. The methods can further include performing one or more additional wellbore operations after introduction of the treatment fluid (e.g., completing the wellbore or stimulating the subterranean formation).

The exemplary fluids disclosed herein can directly or indirectly affect one or more components or pieces of equipment associated with the preparation, delivery, recapture, recycling, reuse, and/or disposal of the disclosed fluids. For example, and with reference to FIG. 1, the disclosed fluids can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the scope of the disclosure.

One or more of the disclosed fluids can be added to the drilling fluid 122 via a mixing hopper 134 communicably coupled to or otherwise in fluid communication with the retention pit 132. The mixing hopper 134 can include, but is not limited to, mixers and related mixing equipment known to those skilled in the art. In other embodiments; however, the disclosed fluids can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the disclosed fluids can be stored, reconditioned, and/or regulated until added to the drilling fluid 122.

As mentioned above, the disclosed fluids can directly or indirectly affect the components and equipment of the drilling assembly 100. For example, the disclosed fluids can directly or indirectly affect the fluid processing unit(s) 128 which can include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the exemplary fluids.

The disclosed fluids can directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids can also directly or indirectly affect the mixing hopper 134 and the retention pit 132 and their assorted variations.

The disclosed fluids can also directly or indirectly affect the various downhole equipment and tools that can come into contact with the fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids can also directly or indirectly affect any downhole heat exchangers, valves and corresponding actuation devices, tool seals, packers and other wellbore isolation devices or components, and the like associated with the wellbore 116. The disclosed fluids can also directly or indirectly affect the drill bit 114, which can include, but is not limited to, roller cone bits, PDC bits, natural diamond bits, any hole openers, reamers, coring bits, etc.

While not specifically illustrated herein, the disclosed fluids can also directly or indirectly affect any transport or delivery equipment used to convey the fluids to the drilling assembly 100 such as, for example, any transport vessels, conduits, pipelines, trucks, tubulars, and/or pipes used to fluidically move the fluids from one location to another, any pumps, compressors, or motors used to drive the fluids into motion, any valves or related joints used to regulate the pressure or flow rate of the fluids, and any sensors (i.e., pressure and temperature), gauges, and/or combinations thereof, and the like.

EXAMPLES

To facilitate a better understanding of the present invention, the following examples of certain aspects of preferred embodiments are given. The following examples are not the only examples that could be given according to the present invention and are not intended to limit the scope of the invention.

For Table 1 and FIGS. 2-15, several simple fluids were prepared and tested according to the procedure for the specific test in the Detailed Description above. The fluids could contain the following ingredients:

water;
a water-soluble salt;
un-modified cellulose nanofibrils "UCNF";
high-charged carboxymethylated cellulose nanofibrils "C-CNF1";
medium-charged carboxymethylated cellulose nanofibrils "C-CNF2";
low-charged carboxymethylated cellulose nanofibrils "C-CNF3";
TEMPO oxidized cellulose nanofibrils "TOCNF"; or
water-soluble carboxymethylcellulose "CMC".

Un-modified cellulose nanofibrils "UCNF" were produced from fully bleached cellulosic softwood fibers via mechanical deconstruction with a micro-fluidizer (Microfluidics M-110Y). The counter ions in the original pulp were all exchanged into sodium form by ionic exchange followed by a mechanical pre-treatment with a PFI mill for 5,000 revolutions. The surface density charges were obtained by polyelectrolyte titration (PolyDADMAC 0.001 N), and the surface density charge of UCNF was 32 microequivalents per gram ($\mu$eq/g).

High-charge, medium-charge, and low-charge carboxymethylation of the fibers (C-CNF1, C-CNF2, and C-CNF3)

were performed after the mechanical pre-treatment followed by the nanofibrillation of the fibers via micro-fluidization for 20 passes.

High-charged C-CNF1 were then prepared by washing three times with ethanol and letting dry overnight under air flow. The nanofibers were then dispersed in 2-propanol, then slowly adding 0.5 grams (g) of sodium hydroxide per g of fibers over 30 min and mixing for 1 hour, then slowly adding 0.08 g of chloroacetic acid per g of fibers over 30 min. This mixture was then heated to 131° F. (55° C.) and mixed for 3 hours (hr). The mixture was then vacuum-filtered to obtain the fibers. The fibers were then dispersed in methanol and neutralized with acetic acid. The fibers were once again vacuum-filtered, dispersed in freshwater to rinse, and centrifuged 3 times to separate the fibers. The surface density charge of C-CNF1 was 225.4 µeq/g.

Medium-charged C-CNF2 were then prepared by dispersing the nanofibers in a solution of ethanol for 25 minutes (min) and the solvent was exchanged three times. Afterwards, the fibers were added to a solution of chloroacetic acid in 2-propanol (0.006 g chloroacetic acid/g pulp in 35 g of 2-propanol/g pulp) over the course of 30 min. The fibers were filtered and immersed into a boiling solution of sodium hydroxide, methanol, and 2-propanol (12 mL methanol/g pulp, 40 mL 2-propanol/g pulp, and 0.3 g NaOH/g pulp). The mixture was allowed to sit for 1 hr. The mixture was then filtered and the fibers were suspended in 1 L of 80 volume % (vol %) methanol solution, neutralized with glacial acetic acid. Once neutralized, the fibers were filtered and washed three times with absolute methanol, followed by washing three times with water, using centrifugation at 12,000 rpm for 20 min each time to remove the water in each washing step. Afterwards, the fibers were filtered and re-dispersed in water to 1 weight % (wt %) solid content. The surface density charge of C-CNF2 was 141 µeq/g.

Low-charged C-CNF3 were then prepared by dispersing the nanofibers on a solution of ethanol for 25 min and the solvent was exchanged three times. Afterwards, the fibers were added to a solution of chloroacetic acid in 2-propanol (0.006 g chloroacetic acid/g pulp in 35 g of 2-propanol/g pulp) over the course of 30 minutes. The fibers were filtered and immersed into a boiling solution of sodium hydroxide, methanol, and 2-propanol (12 mL methanol/g pulp, 40 mL 2-propanol/g pulp, and 0.3 g NaOH/g pulp). The mixture was allowed to sit for 1 hr. The fibers were filtered and washed with water four times to remove any unreacted chemicals. Afterwards, the fibers were filtered and re-dispersed in water to 1 wt % solid content. The surface density charge of C-CNF3 was approximately 100 µeq/g.

TEMPO oxidized fibrils TOCNF were then prepared by dispersing cellulose fibers in deionized water, then slowly adding 16 milligrams (mg) of (2,2,6,6-Tetramethylpiperidin-1-yl)oxy "TEMPO" and 0.1 g of sodium bromide salt per g of fibers. 3.5 millimoles (mmol) of sodium hypochlorite per g of fibers was then added to the mixture and the pH of the mixture was maintained at 10 using 0.5 molar (M) sodium hydroxide. The mixture was then neutralized with hydrochloric acid, washed with freshwater, and vacuum-filtered to obtain the fibers. The fibers were then dispersed in deionized water at a concentration of 1.1% by weight of the water and placed in a laboratory fiber refiner (PFI mill) for 20 min at a speed of 20,000 rpm. Mechanical deconstruction of the fibers was then performed with a micro-fluidizer (Microfluidics M-110Y). The surface density charge of TOCNF was 92 µeq/g.

The carboxymethylcellulose CMC was a commercially-available product from Sigma Aldrich having a molecular weight of 90 kDa.

Table 1 lists the curve fitting parameters for the Herschel-Bulkley model—yield stress ($\tau_0$), viscosity index (k), flow index (n), and apparent viscosity ($\eta$) at 0.01 sec$^{-1}$ for fluids containing 0.5% by weight of the base fluid of un-modified cellulose nanofibrils "UCNF" as Fluid #1, high-charged carboxymethylated cellulose nanofibrils "C-CNF1" as Fluid #2, medium-charged carboxymethylated cellulose nanofibrils "C-CNF2" as Fluid #3, or TEMPO oxidized cellulose nanofibrils "TOCNF" as Fluid #4 in either an "electrolyte" solution of 25 mM calcium chloride in water or "no electrolyte" of just deionized water. As can be seen, without an electrolyte, chemical modification of the cellulose nanofibrils causes the viscosity index, flow index, and apparent viscosity to decrease and the yield stress to increase. With the electrolyte, the choice of chemical modification has a marked effect on the yield stress and apparent viscosity with C-CNF2 and TOCNF having values closer to the UCNF. Moreover, the presence of an electrolyte substantially increases the apparent viscosity of the fluids compared to fluids prepared without an electrolyte.

TABLE 1

| Type of Base Fluid | Fluid # | Yield Stress, $\tau_0$ (Pa) | Viscosity Index, k (Pa * s) | Flow Index, n | Apparent Viscosity, $\eta$ (Pa * s) |
|---|---|---|---|---|---|
| No electrolyte | 1 | 1.1 | 0.4 | 0.6 | 23 |
| | 2 | 1.4 | 0.17 | 0.7 | 4.1 |
| | 3 | 1.4 | 0.05 | 0.83 | 3.6 |
| | 4 | 1.9 | 0.07 | 0.78 | 8.1 |
| Electrolyte | 1 | 2.2 | 0.04 | 0.86 | 65.8 |
| | 2 | 2.1 | 0.03 | 0.9 | 16.6 |
| | 3 | 4.6 | 0.08 | 0.75 | 63.1 |
| | 4 | 6.3 | 0.02 | 0.94 | 52.6 |

Table 2 lists the type of modified cellulose nanofibrils used in FIGS. 2A-15.

TABLE 2

Fluid #1 Un-modified cellulose nanofibrils "UCNF"
Fluid #2 high-charged carboxymethylated cellulose nanofibrils "C-CNF1"
Fluid #3 medium-charged carboxymethylated cellulose nanofibrils "C-CNF2"
Fluid #4 TEMPO oxidized cellulose nanofibrils "TOCNF"
Fluid #5 low-charged carboxymethylated cellulose nanofibrils "C-CNF3"

FIGS. 2A-2D are graphs of apparent viscosity (Pa*s) as a function of shear rate (1/s) for Fluids #1-#4. FIGS. 3A-3D are graphs of storage modulus (G') for Fluids #1-#4. As can be seen in the graphs, the fluids exhibited viscoelastic behavior. Chemical modification of CNF to increase the surface charge causes a decrease in the dispersion viscosity at low shear rates (0.01 s$^{-1}$). A high surface charge produces an increased osmotic pressure and thus leads to inter-fibril repulsion. A decrease in the entanglement causes a reduction in the apparent viscosity. The addition of electrolytes increased the apparent viscosity for shear rates below 1 s$^{-1}$ for the modified and the un-modified CNF. It is theorized that the electrolyte shields the charge of the nanofibrils and might favor fibril entanglement, which can also cause a viscosifying effect. For shear rates above 50 s$^{-1}$, the apparent viscosity of the fluids is not affected by electrolytes, or only to a limited extent. Shearing appears to be the dominate force to break down fibril entanglement, independently of the ionic strength. Moreover, for shear rates between 1 to 50 s⁻¹, the flow curves in FIGS. 2A-2D present a shoulder when electrolytes are added. The fluids store some energy given by the shear and orient in the direction of the flow. Then the system releases energy, causing the shoulder in the profile, which produces re-entanglement of the nanofibers. Each of the modified CNFs produced very similar flow curves compared to the un-modified CNF fluid. For FIGS. 3A-3D, G' increased in the presence of the electrolyte, which enhanced the viscoelasticity of the fluids.

Figure 4:
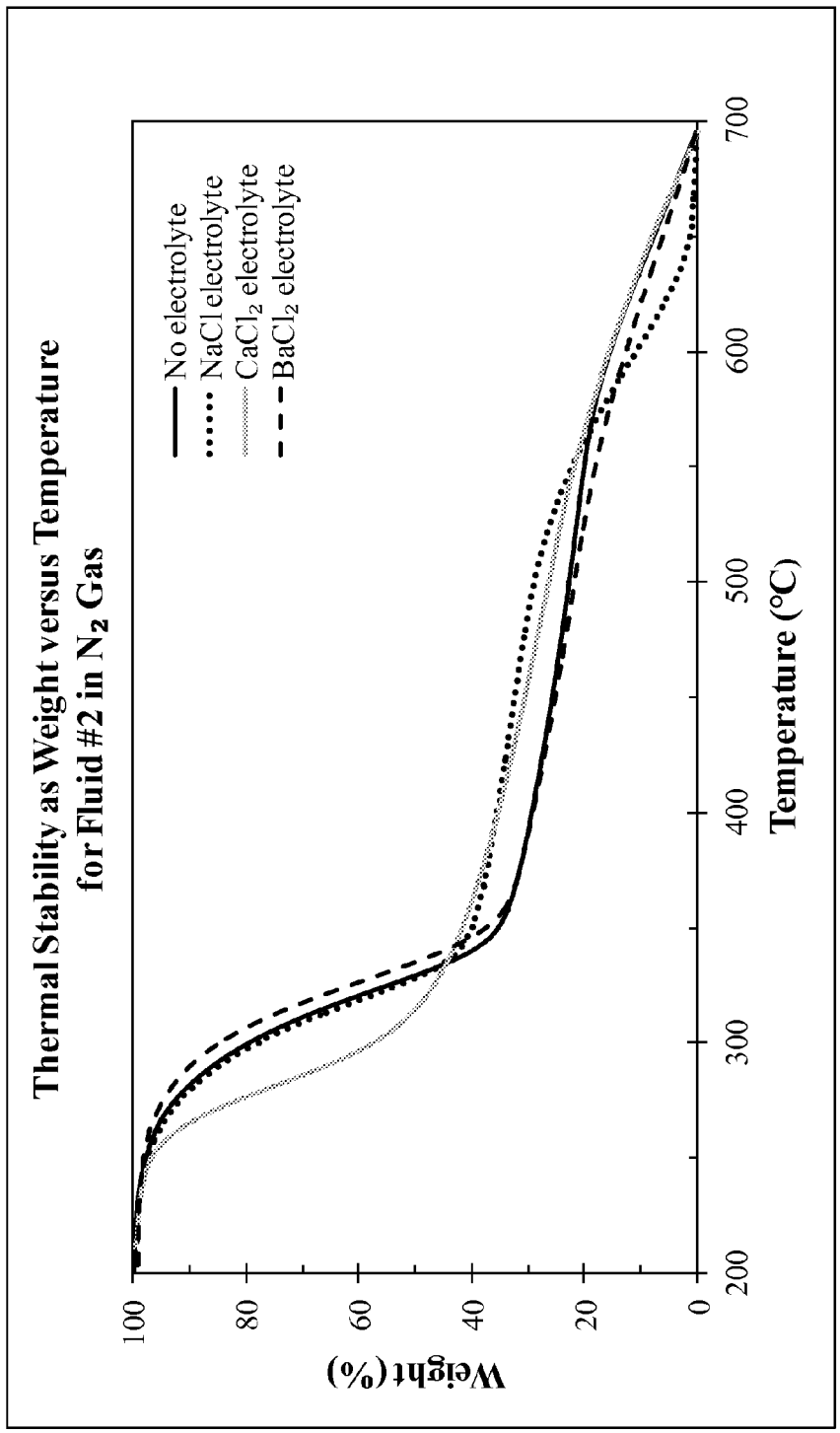
FIG. 4 is a graph of the thermal stability as weight (%) versus temperature (° C.) for 4 different fluids containing a high-charged, carboxymethylated cellulose nanofibrils in various electrolytes.
Figure 5:
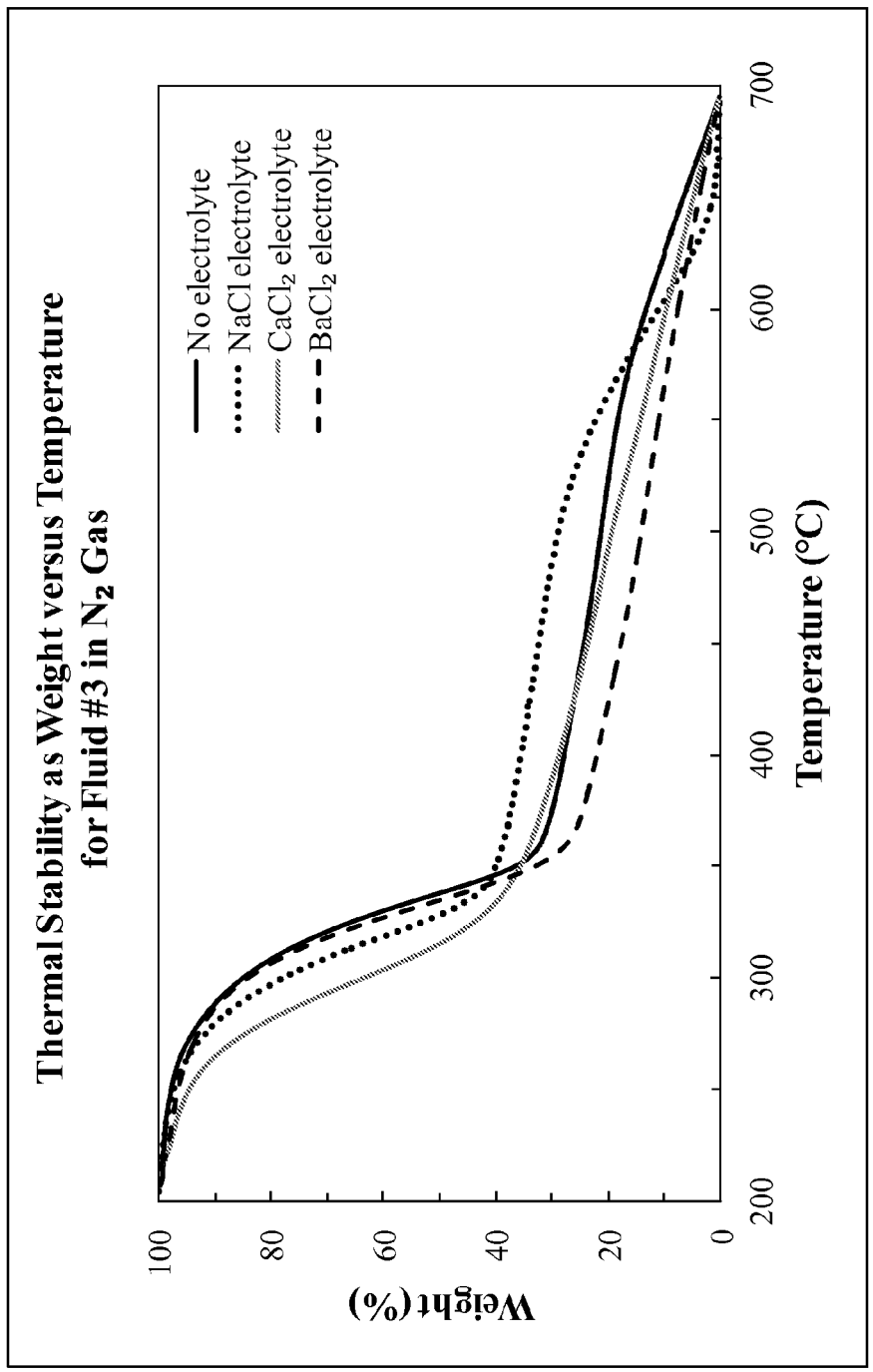
FIG. 5 is a graph of the thermal stability as weight (%) versus temperature (° C.) for 4 different fluids containing a medium-charged, carboxymethylated cellulose nanofibrils in various electrolytes.

FIGS. 4 and 5 are graphs of the thermal stability as weight (%) versus temperature (° C.) for Fluid #2 and #3, respectively, comparing the high-charged carboxymethylated cellulose nanofibrils "C-CNF1" and medium-charged carboxymethylated cellulose nanofibrils "C-CNF2" in no electrolyte and 3 different electrolyte solutions. As can be seen in the graphs, there is an important reduction in the temperature at which the fibrils begin to degrade with the addition of electrolytes, with calcium having the largest effect. Sodium and barium ions produce only slight changes in the thermal stability compared to the no electrolyte fluid.

Figure 6A:
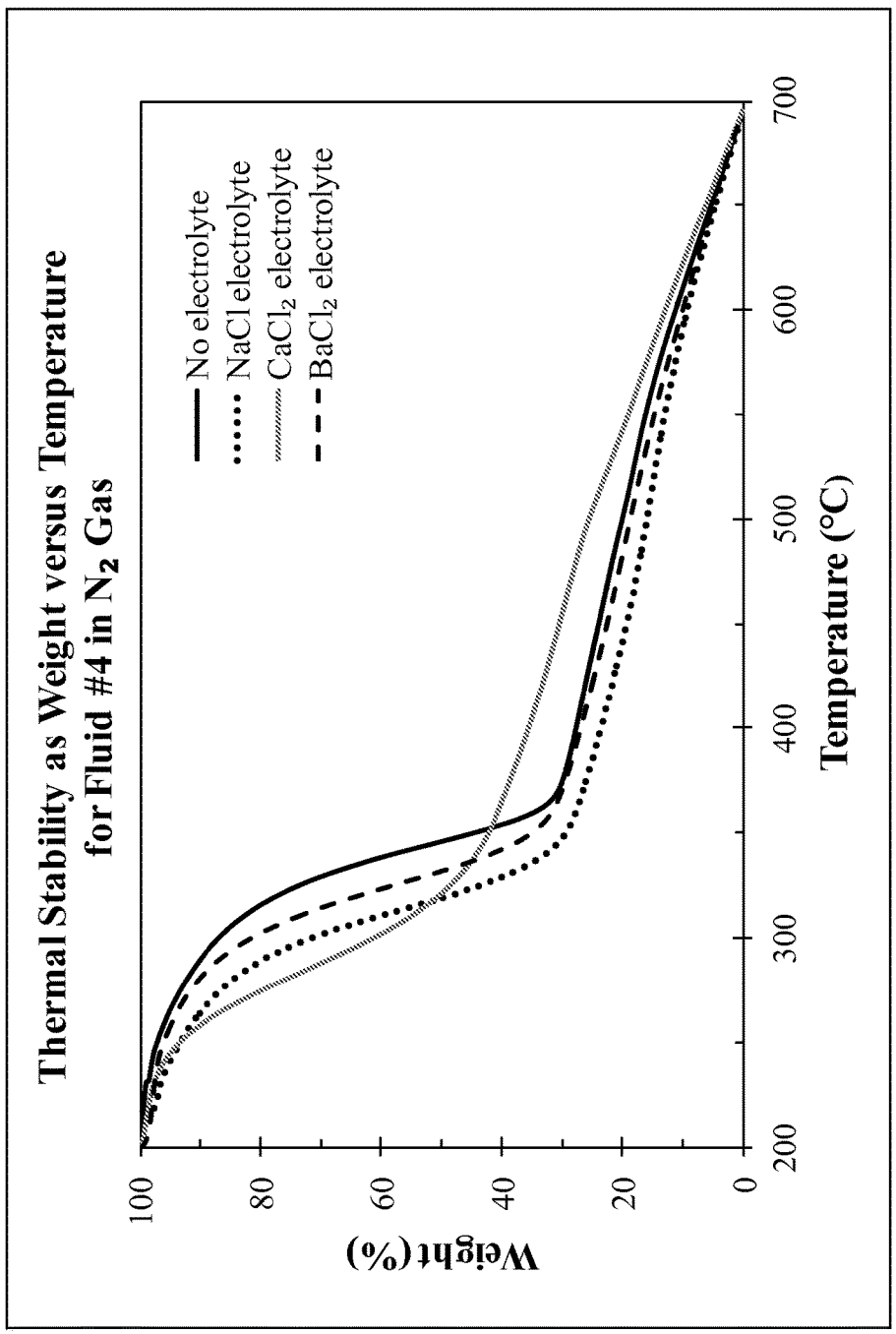
FIG. 6A is a graph of the thermal stability as weight (%) versus temperature (° C.) for 4 different fluids containing a TEMPO oxidized cellulose nanofibrils in various electrolytes using nitrogen gas.
Figure 6B:
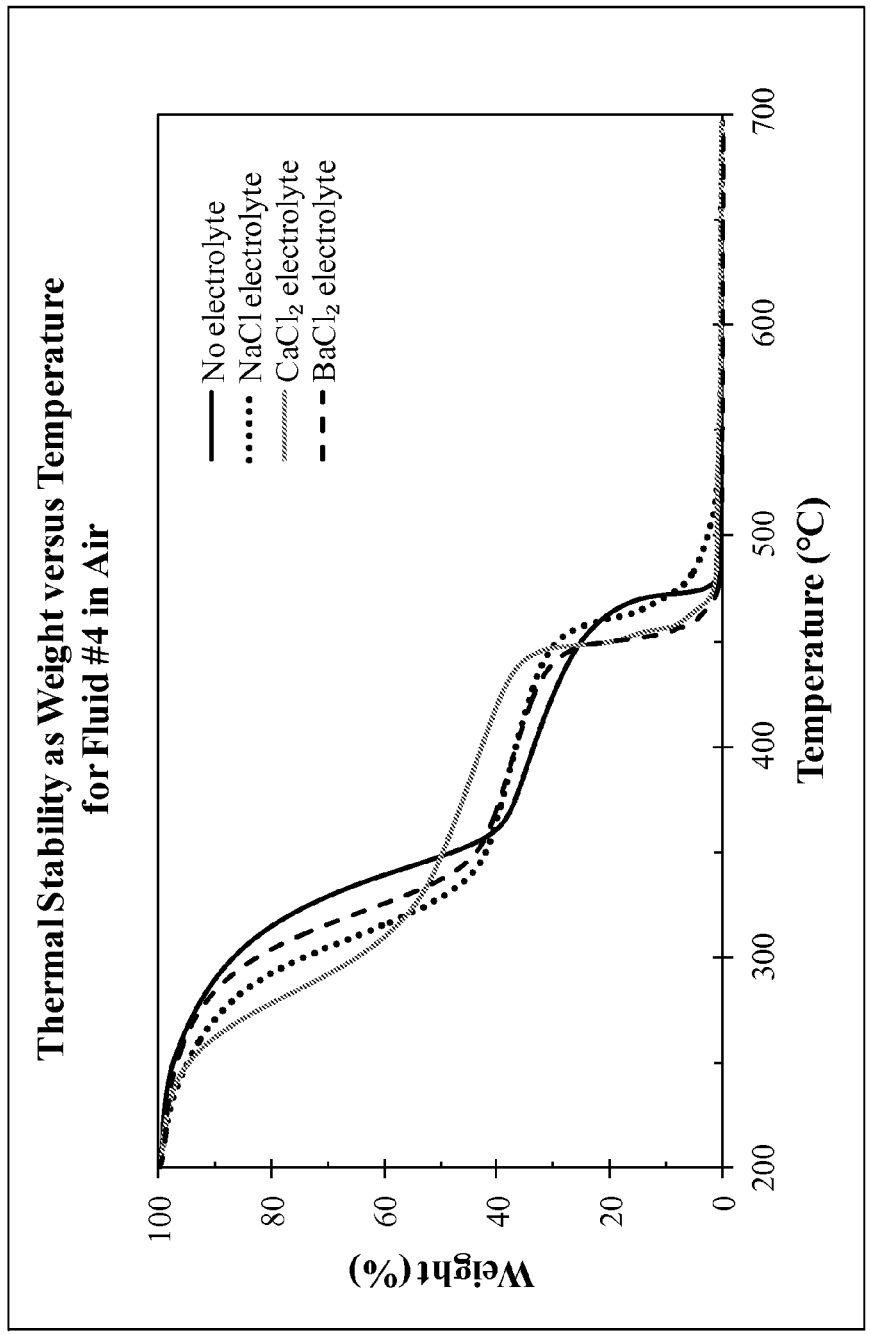
FIG. 6B is a graph of the thermal stability as weight (%) versus temperature (° C.) for the fluids from FIG. 6A using air instead of nitrogen gas.

FIGS. 6A and 6B are graphs of the thermal stability as weight (%) versus temperature (° C.) for Fluid #4 evaluating the TEMPO oxidized cellulose nanofibrils "TOCNF" in no electrolyte and 3 different electrolyte solutions tested in nitrogen gas and air, respectively. As can be seen in the graphs, there is a reduction in the temperature at which the fibrils begin to degrade with the addition of electrolytes, with calcium having the largest effect. Moreover, there is not a significant difference in the thermal stability of the fibrils in any of the base fluids in inert (nitrogen) or oxidizing (air) atmosphere, which indicates that oxidizing conditions do not affect the onset of degradation (thermal stability) of the fibrils.

Figure 7A:
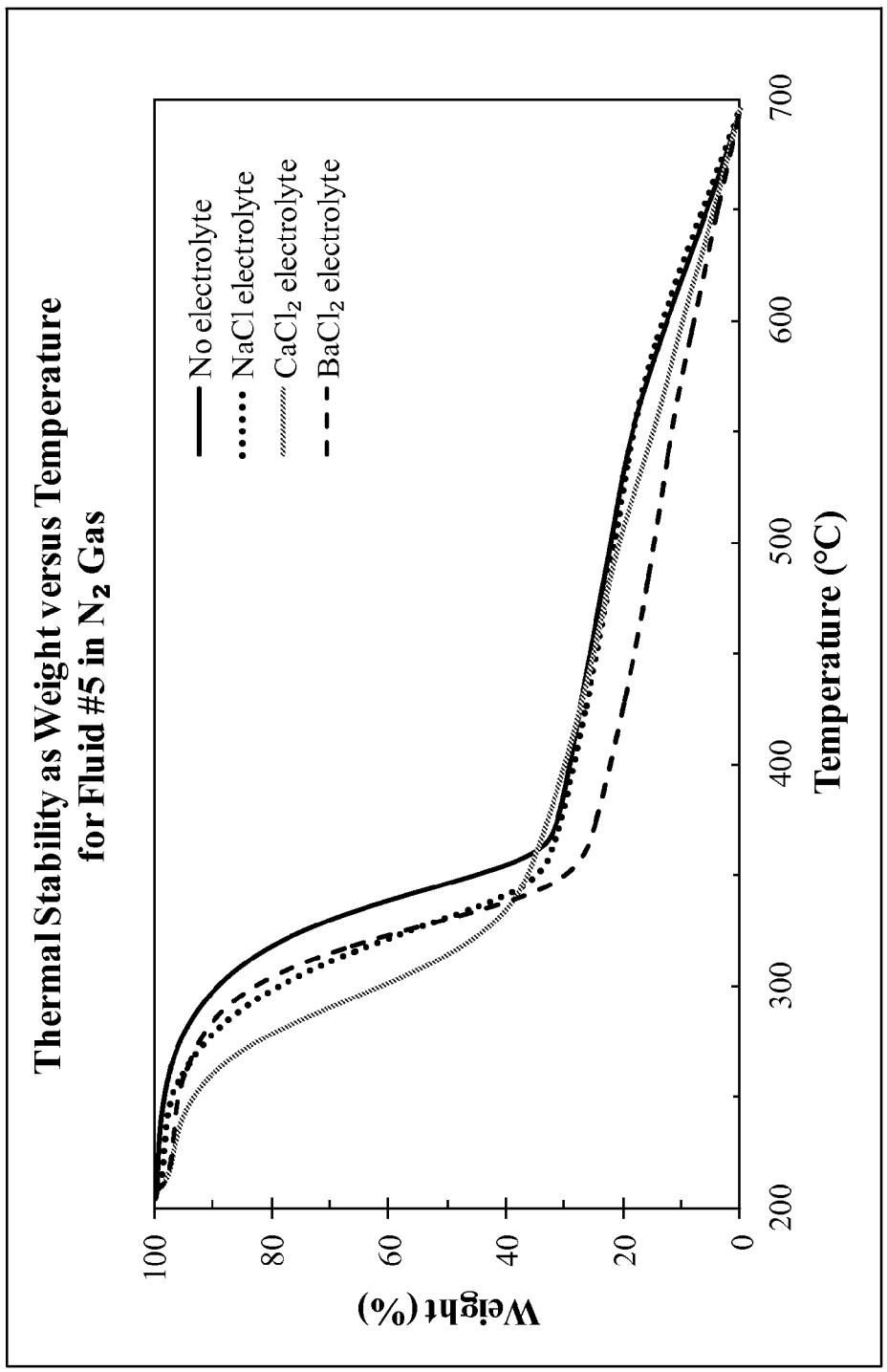
FIG. 7A is a graph of the thermal stability as weight (%) versus temperature (° C.) for 4 different fluids containing a low-charged, carboxymethylated cellulose nanofibrils in various electrolytes using nitrogen gas.
Figure 7B:
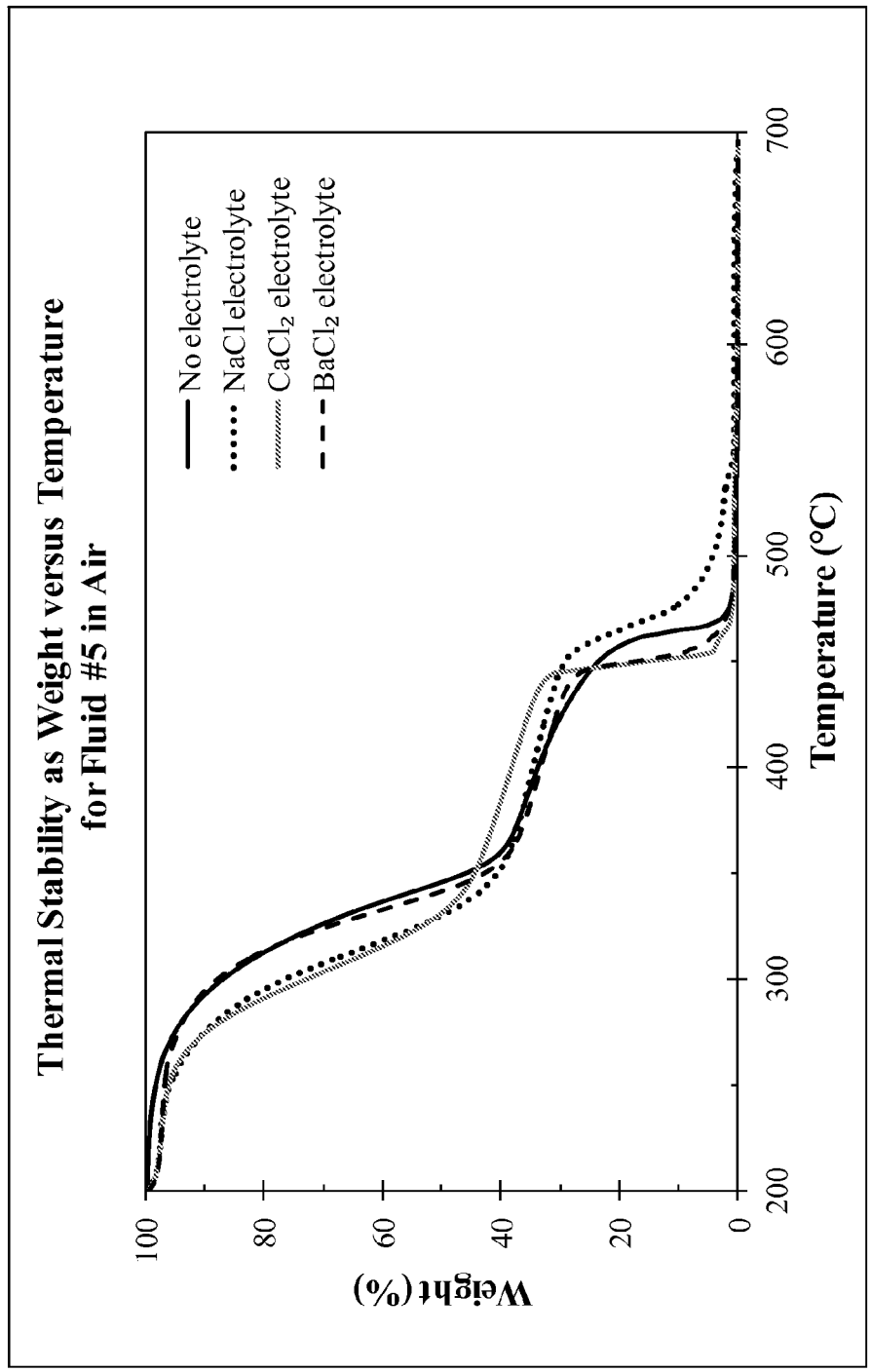
FIG. 7B is a graph of the thermal stability as weight (%) versus temperature (° C.) for the fluids from FIG. 7A using air instead of nitrogen gas.

FIGS. 7A and 7B are graphs of the thermal stability as weight (%) versus temperature (° C.) for Fluid #5 evaluating the low-charged carboxymethylated cellulose nanofibrils "C-CNF3" in no electrolyte and 3 different electrolyte solutions tested in nitrogen gas and air, respectively. As can be seen in the graphs, there is a reduction in the temperature at which the fibrils begin to degrade with the addition of electrolytes, with calcium having the largest effect. Moreover, there is not a significant difference in the thermal stability of the fibrils in any of the base fluids in inert (nitrogen) or oxidizing (air) atmosphere, which indicates that oxidizing conditions do not affect the onset of degradation (thermal stability) of the fibrils. Moreover, when comparing the TOCNF fluids versus the C-CNF3 fluids, the TOCNF fluids had a slightly lower onset point (lower thermal stability) in the calcium chloride electrolyte.

Figure 8:
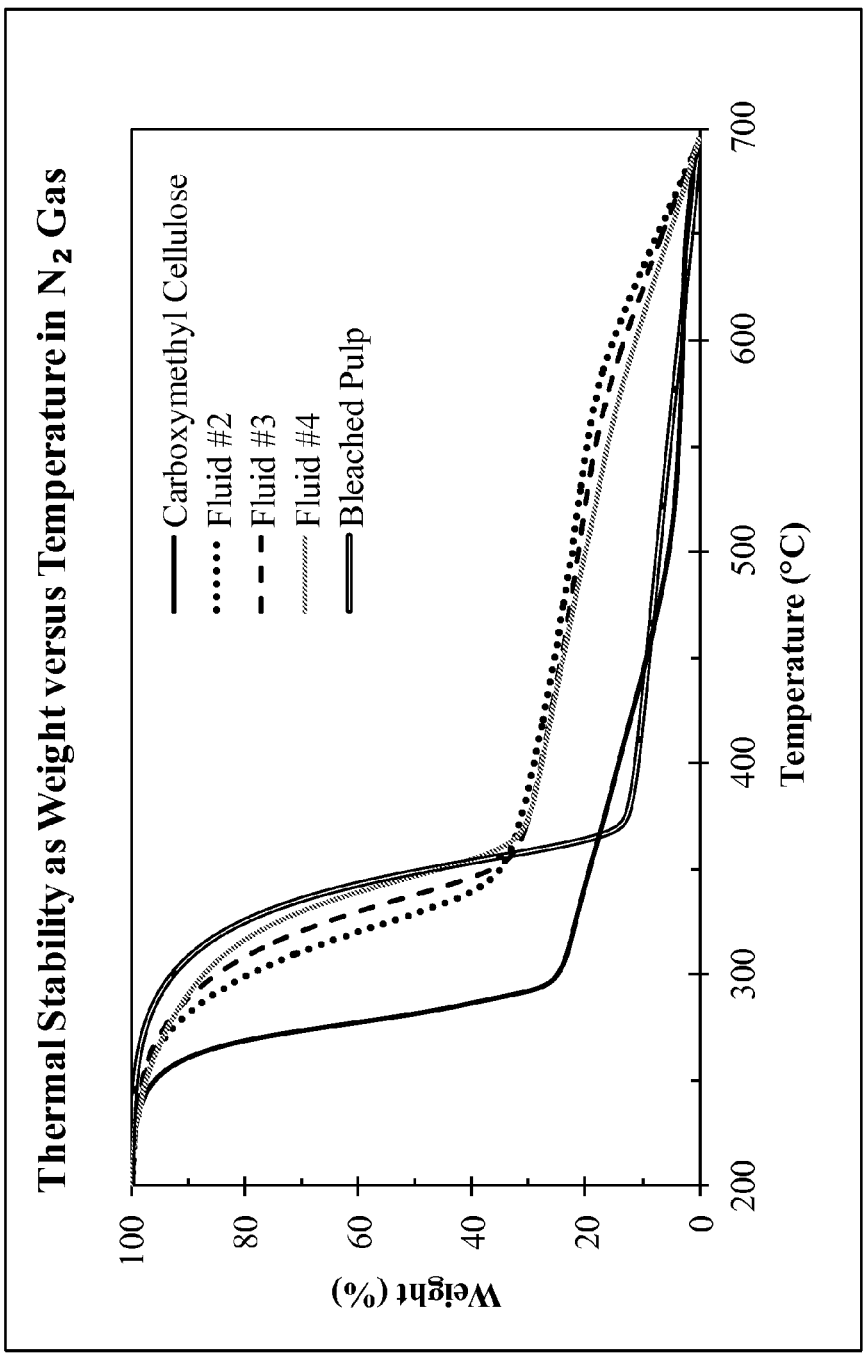
FIG. 8 is a graph of the thermal stability as weight (%) versus temperature (° C.) for 5 different fluids containing different cellulose additives using nitrogen gas.

FIG. 8 is a graph of the thermal stability as weight (%) versus temperature (° C.) for several fluids tested in nitrogen gas in no electrolyte to compare the thermal stability of water-soluble carboxymethylcellulose "CMC," Fluid #2, Fluid #3, Fluid #4 (C-CNF1, C-CNF2, and TOCNF, respectively), and bleached pulp, which is the starting material for production of the un-modified and modified cellulose nanofibrils. As can be seen in the graphs, the stability of the modified cellulose nanofibrils (C-CNF1, C-CNF2, and TOCNF) is higher than that of commercial CMC. Moreover, chemical modification of cellulose nanofibrils by carboxymethylation or TEMPO oxidation produces slight changes on thermal stability compared to bleached pulp.

Figure 9:
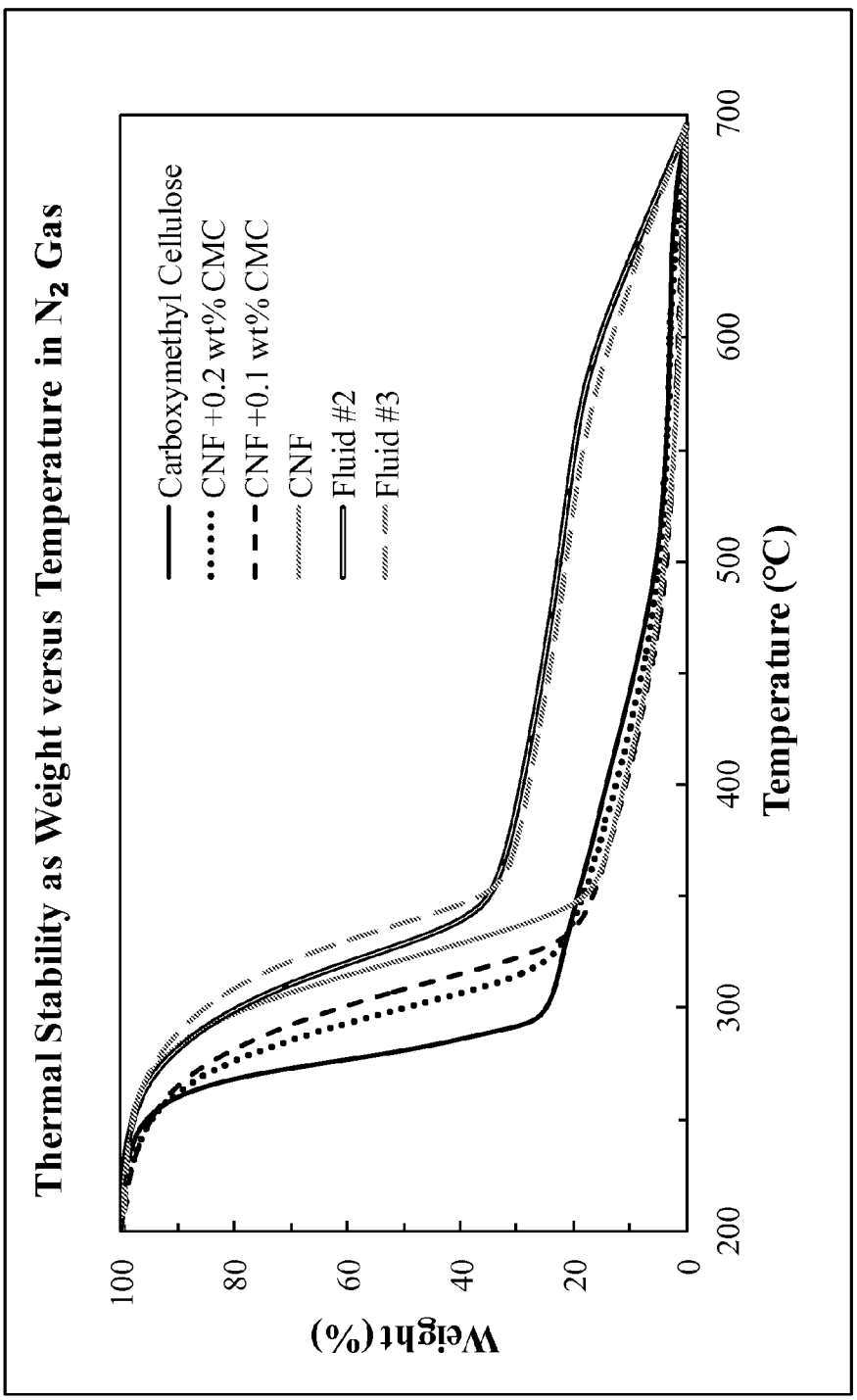
FIG. 9 is a graph of the thermal stability as weight (%) versus temperature (° C.) for 6 different fluids containing different cellulose additives using nitrogen gas.

FIG. 9 is a graph of the thermal stability as weight (%) versus temperature (° C.) for several fluids tested in nitrogen gas in no electrolyte to compare the thermal stability of water-soluble carboxymethylcellulose "CMC," Fluid #1, Fluid #2, Fluid #3 (UCNF, C-CNF1, and C-CNF2, respectively), and un-modified cellulose nanofibrils "UCNF" with the addition of 2 different concentrations of CMC. As can be seen in the graphs, it is clearly observed that the thermal stability of un-modified cellulose nanofibril fluids after the addition of CMC decreased compared to the unmodified and chemically modified CNF.

Figure 10:
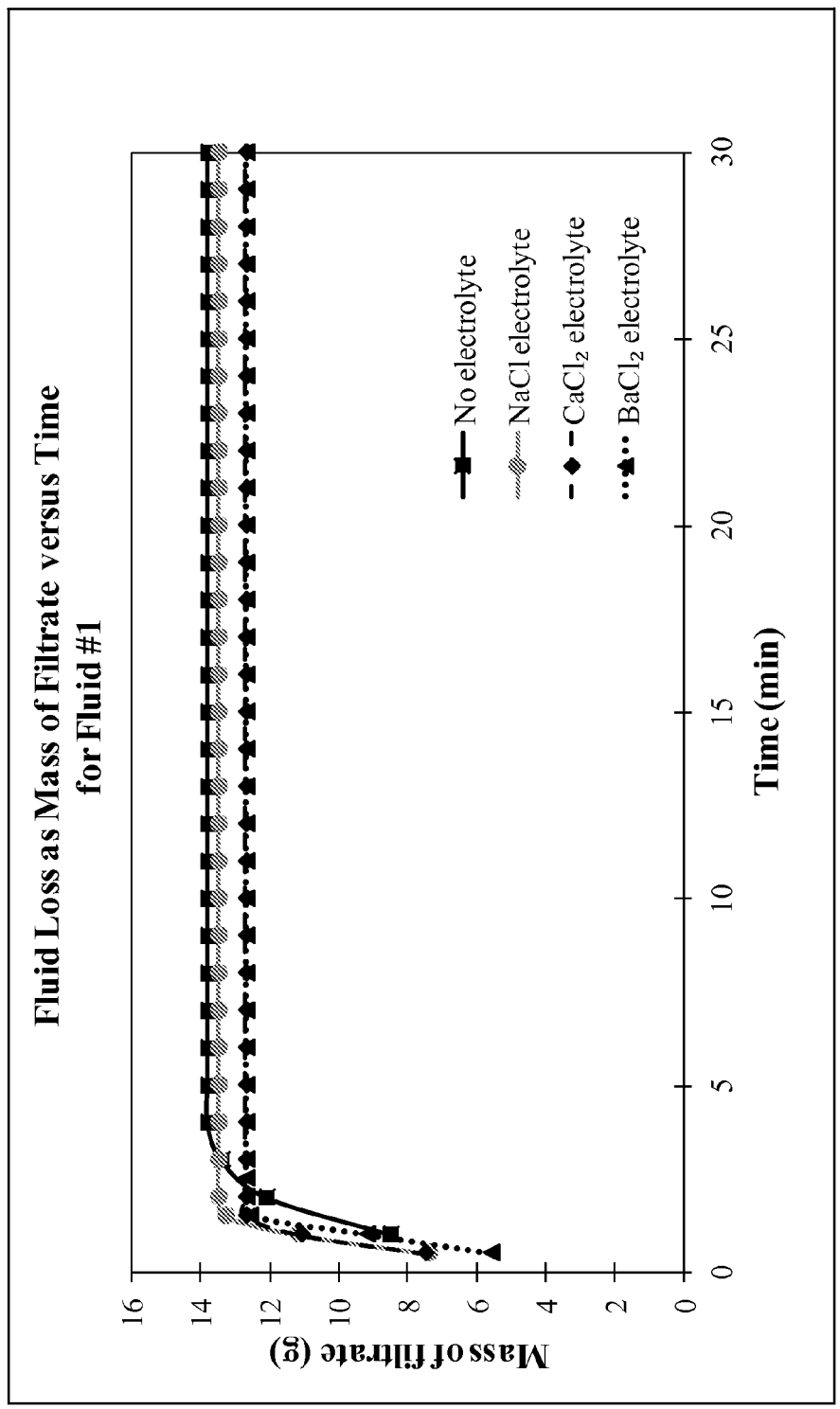
FIG. 10 is a graph of the fluid loss as mass of filtrate (g) versus time (min) for a fluid containing unmodified cellulose nanofibrils in various electrolytes.

FIGS. 10-15 are graphs of fluid loss in mass of filtrate (g) versus time (min) for several fluids. Fluid loss was performed at a temperature of 77° F. (25° C.) and a pressure differential of 100 psi. FIG. 10 is fluid loss for Fluid #1 in no electrolyte and 3 different electrolyte solutions. As can be seen, all of the fluids had comparable fluid loss with the electrolyte solutions providing slightly lower fluid loss values. Even though the fluids did not have a fluid loss of less than 2 g/30 min, the fluids only contained water and the additive instead of being a fully-formulated wellbore treatment fluid including other commonly-used additives. It is theorized that a fully-formulated fluid would demonstrate acceptable fluid loss values.

Figure 11:
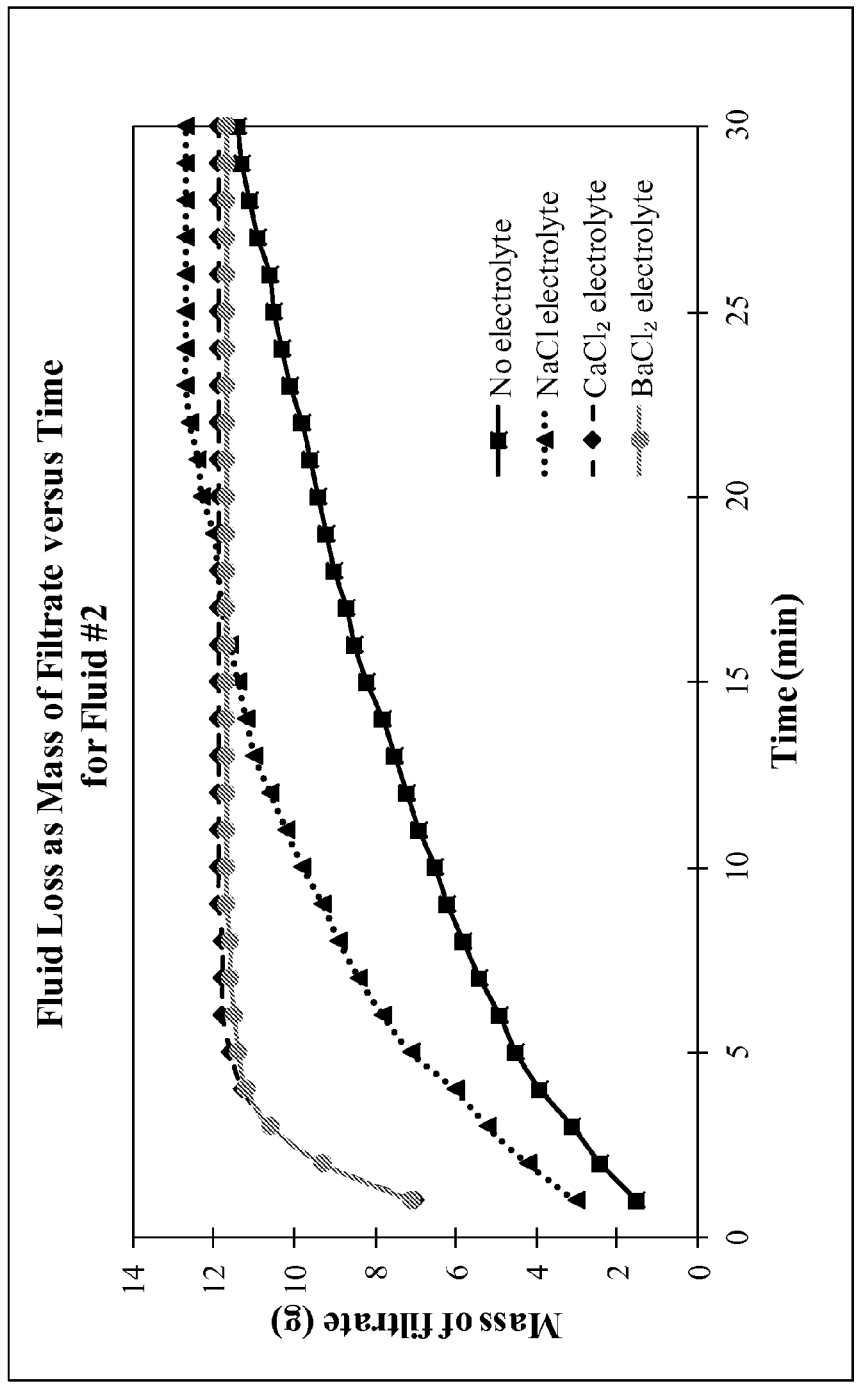
FIG. 11 is a graph of the fluid loss as mass of filtrate (g) versus time (min) for a fluid containing high-charged, carboxymethylated cellulose nanofibrils in various electrolytes.

FIG. 11 is fluid loss for Fluid #2 in no electrolyte and 3 different electrolyte solutions. As can be seen, the addition of an electrolyte increased the fluid loss values compared to no electrolyte. Even though the fluids did not have a fluid loss of less than 2 g/30 min, the fluids only contained water and the additive instead of being a fully-formulated wellbore treatment fluid including other commonly-used additives. It is theorized that a fully-formulated fluid would demonstrate acceptable fluid loss values.

Figure 12:
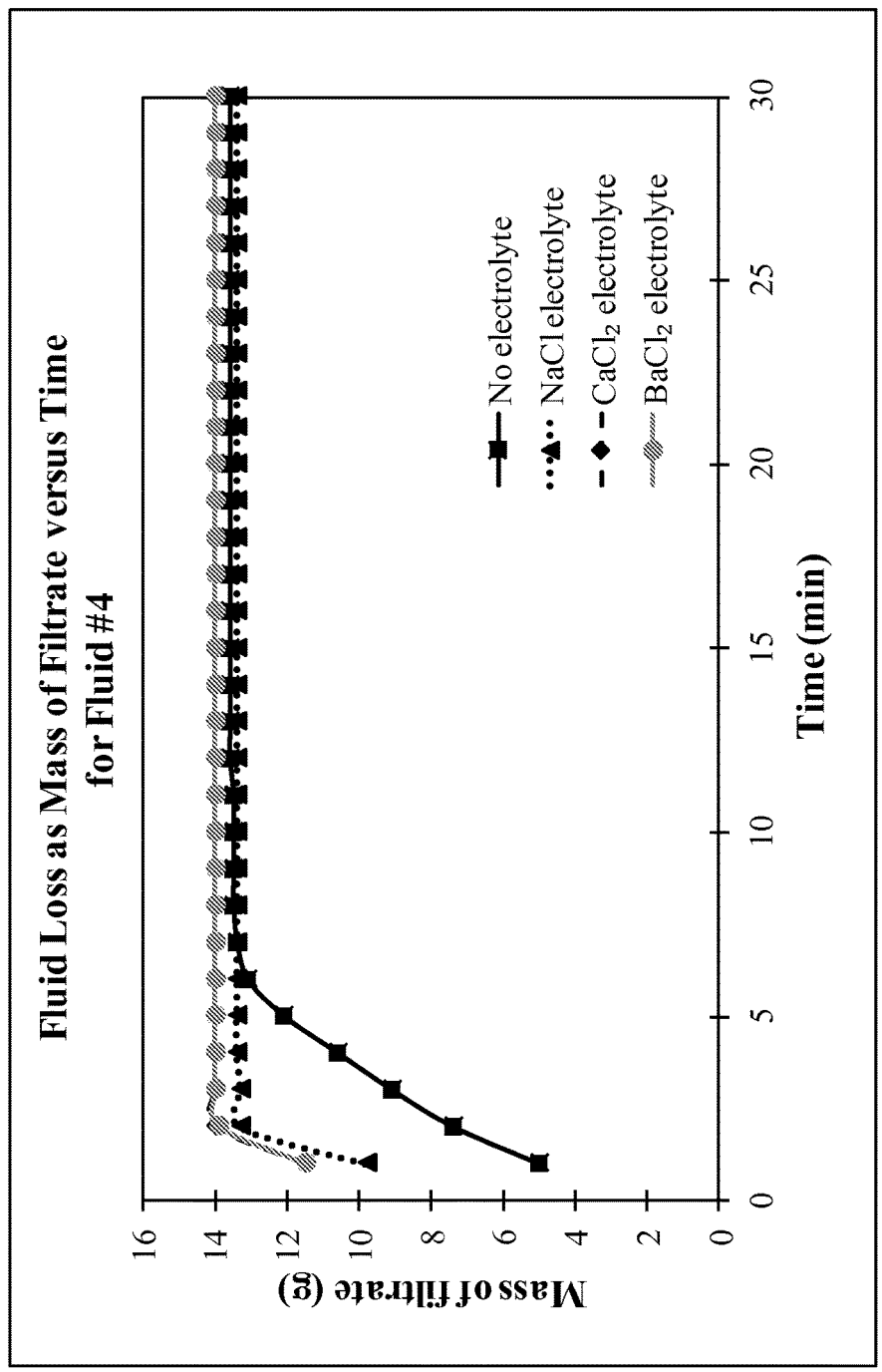
FIG. 12 is a graph of the fluid loss as mass of filtrate (g) versus time (min) for a fluid containing TEMPO oxidized cellulose nanofibrils in various electrolytes.

FIG. 12 is fluid loss for Fluid #4 in no electrolyte and 3 different electrolyte solutions. As can be seen, all of the fluids had comparable fluid loss with the electrolyte solutions providing slightly higher and lower fluid loss values compared to the no electrolyte. Even though the fluids did not have a fluid loss of less than 2 g/30 min, the fluids only contained water and the additive instead of being a fully-formulated wellbore treatment fluid including other commonly-used additives. It is theorized that a fully-formulated fluid would demonstrate acceptable fluid loss values.

Figure 13:
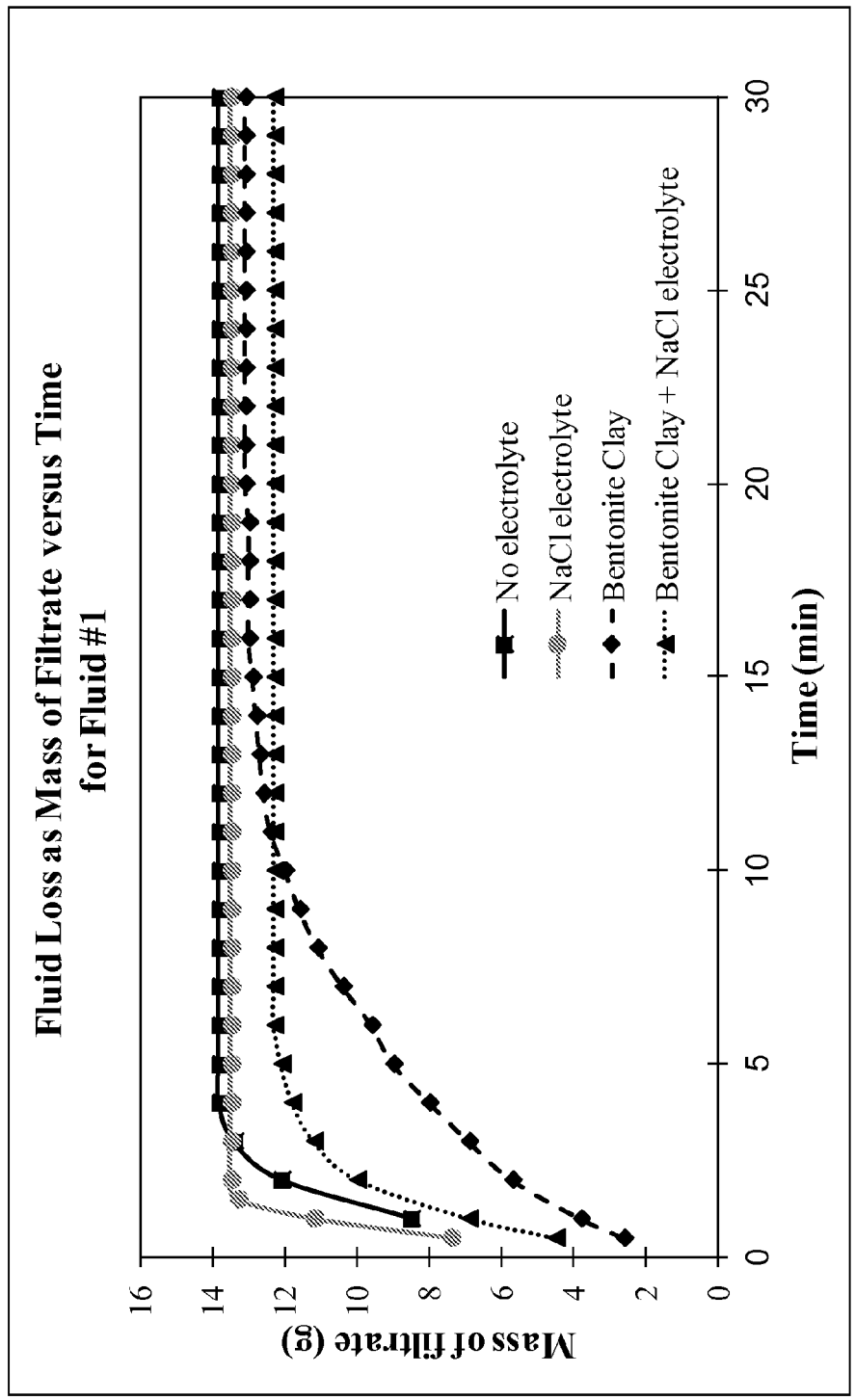
FIG. 13 is a graph of the fluid loss as mass of filtrate (g) versus time (min) for a fluid containing unmodified cellulose nanofibrils with electrolyte, bentonite clay, or combinations of clay and salt.

FIG. 13 is fluid loss for Fluid #1 in no electrolyte and in a 0.1 molar (M) sodium chloride electrolyte solution and in no electrolyte with a 1% by weight bentonite clay and in the NaCl electrolyte with the bentonite clay. As can be seen, the fluids including bentonite clay had the lowest fluid loss at 30 minutes with the bentonite clay in no electrolyte having the lowest fluid loss values of all 4 fluids. This indicates that a fully-formulated wellbore fluid might exhibit desirable fluid loss. Even though the fluids did not have a fluid loss of less than 2 g/30 min, the fluids only contained water and the additive instead of being a fully-formulated wellbore treatment fluid including other commonly-used additives. It is theorized that a fully-formulated fluid would demonstrate acceptable fluid loss values.

Figure 14:
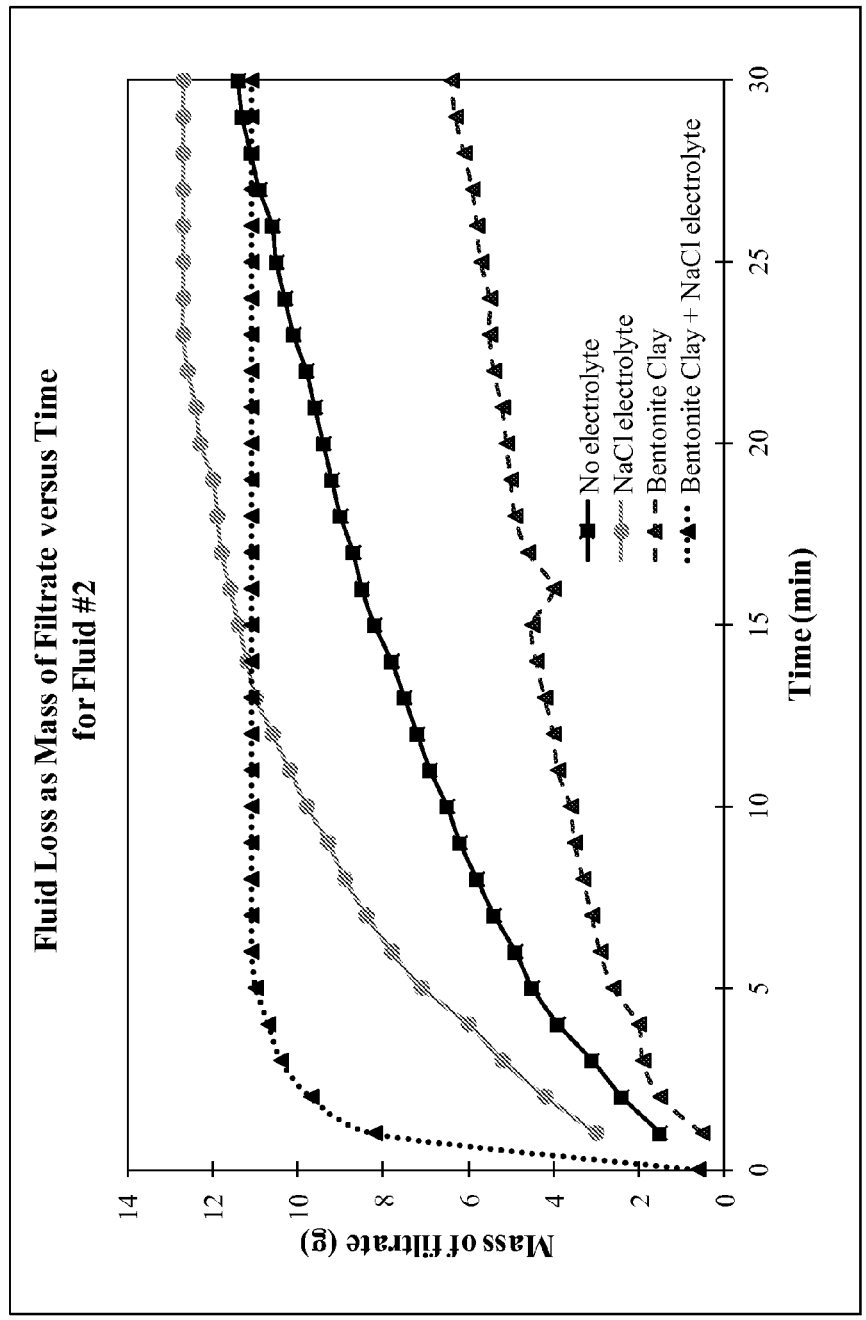
FIG. 14 is a graph of the fluid loss as mass of filtrate (g) versus time (min) for a fluid containing high-charged, carboxymethylated cellulose nanofibrils with electrolyte, bentonite clay, or combinations of clay and salt.

FIG. 14 is fluid loss for Fluid #2 in no electrolyte and in a 0.1 M sodium chloride electrolyte solution and in no electrolyte with a 1% by weight bentonite clay and in the NaCl electrolyte with the bentonite clay. As can be seen, the fluids including bentonite clay had the lowest fluid loss with the bentonite clay in electrolyte having the lowest fluid loss values of all 4 fluids. This indicates that a fully-formulated wellbore fluid might exhibit desirable fluid loss. Even though the fluids did not have a fluid loss of less than 2 g/30 min, the fluids only contained water and the additive instead of being a fully-formulated wellbore treatment fluid including other commonly-used additives. It is theorized that a fully-formulated fluid would demonstrate acceptable fluid loss values.

Figure 15:
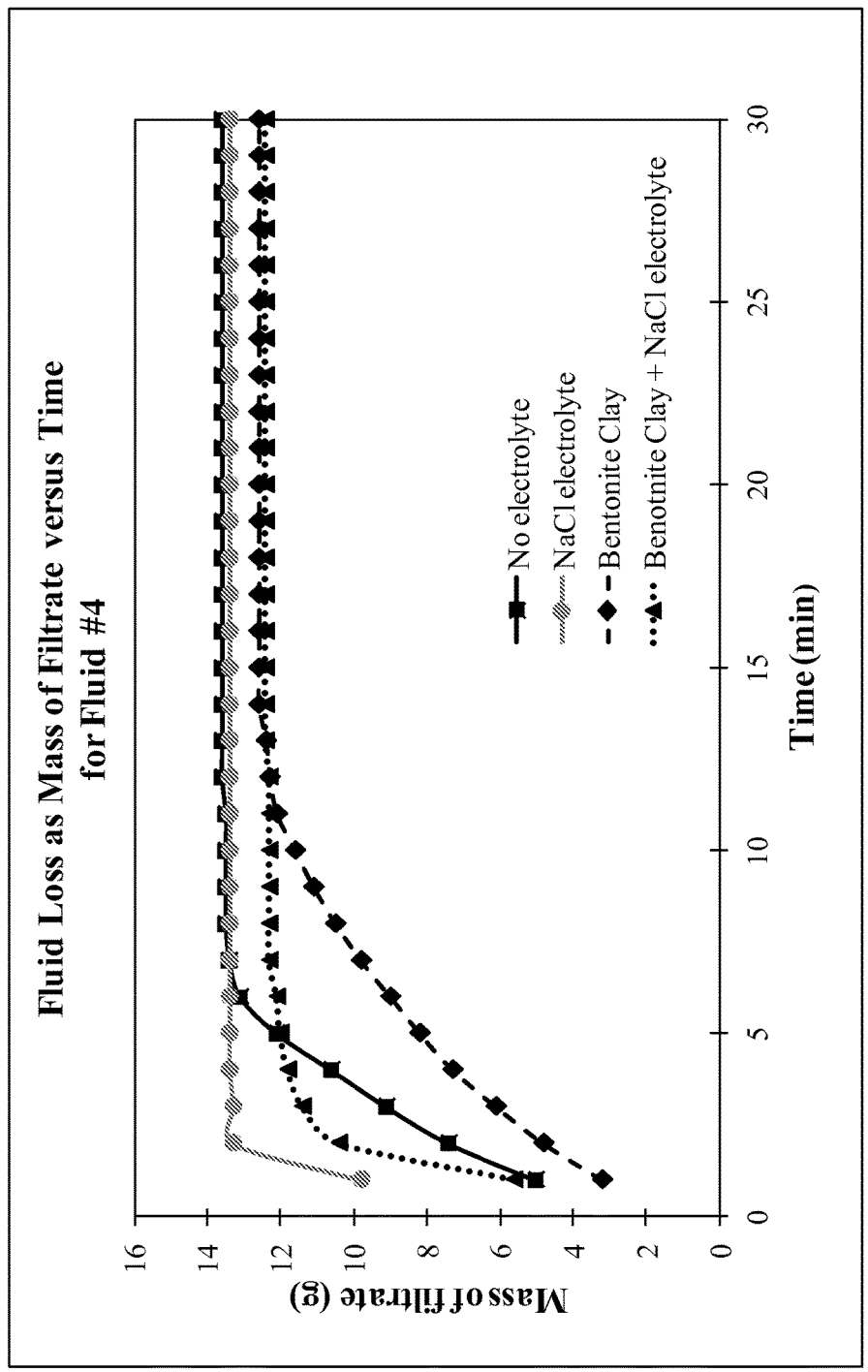
FIG. 15 is a graph of the fluid loss as mass of filtrate (g) versus time (min) for a fluid containing TEMPO oxidized cellulose nanofibrils with electrolyte, bentonite clay, or combinations of clay and salt.

FIG. 15 is fluid loss for Fluid #4 in no electrolyte and in a 0.1 molar (M) sodium chloride electrolyte solution and in no electrolyte with a 1% by weight bentonite clay and in the NaCl electrolyte with the bentonite clay. As can be seen, the fluids including bentonite clay had the lowest fluid loss values of all 4 fluids. Even though the fluids did not have a fluid loss of less than 2 g/30 min, the fluids only contained water and the additive instead of being a fully-formulated wellbore treatment fluid including other commonly-used additives. It is theorized that a fully-formulated fluid would demonstrate acceptable fluid loss values.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a portion of a wellbore comprising:
   introducing a treatment fluid into the wellbore, the treatment fluid comprising:
   (A) a base fluid; and
   (B) an additive comprising a first polymer bundle consisting of cellulose nanofibrils; wherein one or more functional groups of the first polymer bundle are chemically modified; wherein the one or more functional groups comprise primary or secondary alcohols; wherein the chemical modification comprises grafting of a second polymer onto the first polymer bundle; wherein the second polymer is selected from the group consisting of cationic cellulose nanofibrils; substituted methyl cellulose; chitosan; chitin; quaternary amino groups, including cationic polyacrylamides, cationic starch, poly(diallyldimethyl ammonium chloride), or epichlorohydrin/dimethylamine polymers; nonionic or anionic polymers, including polyethylene glycol or lignins; and any combinations thereof.

2. The method according to claim 1, wherein the base fluid comprises water.

3. The method according to claim 2, wherein the water is selected from the group consisting of freshwater, saltwater, sea water, brackish water, and combinations thereof.

4. The method according to claim 1, wherein the base fluid comprises an electrolyte.

5. The method according to claim 4, wherein the electrolyte is selected from the group consisting of a salt, acid or base solutions, acid precursors, and combinations thereof.

6. The method according to claim 5, wherein the salt is selected from the group consisting of sodium chloride, calcium chloride, barium chloride, potassium chloride, magnesium chloride, potassium acetate, sodium formate, potassium formate, cesium formate, sodium bromide, potassium bromide, zinc bromide, magnesium sulfate, and combinations thereof.

7. The method according to claim 6, wherein the electrolyte is in a concentration in the range of about 1 millimolar to about 6 molar in the base fluid.

8. The method according to claim 1, wherein the one or more functional groups are located on the surface of the first polymer bundle.

9. The method according to claim 1, wherein the amount of modification of the functional groups is less than or equal to three.

10. The method according to claim 1, wherein the additive is in a concentration in the range of about 0.1% to about 5% by weight of the base fluid.

11. The method according to claim 1, wherein the additive is a viscosifier, a gelling agent, a rheology modifier, or a fluid loss control additive.

12. The method according to claim 1, wherein the treatment fluid is a drilling fluid, a drill-in fluid, a packer fluid, a completion fluid, a spacer fluid, a work-over fluid, an insulating fluid, a cement composition, or a stimulation fluid.

13. The method according to claim 1, wherein the treatment fluid is a drilling fluid; and wherein the drilling fluid is mixed with a mixing hopper.

14. The method according to claim 1, wherein the step of introducing comprises pumping the treatment fluid into the wellbore using a pump.

15. A system comprising:
   a wellbore that penetrates a subterranean formation; and
   a treatment fluid comprising:
   (A) a base fluid; and
   (B) an additive comprising a first polymer bundle consisting of cellulose nanofibrils; wherein one or more functional groups of the first polymer bundle are chemically modified; wherein the one or more functional groups comprise primary or secondary alcohols; wherein the chemical modification comprises grafting of a second polymer onto the first polymer bundle; wherein the second polymer is selected from the group consisting a cationic cellulose nanofibrils; substituted methyl cellulose; chitosan; chitin; cationic polyelectrolytes containing primary, secondary, tertiary or quaternary amino groups, including cationic polyacrylamides, cationic starch, poly(diallyldimethyl ammonium chloride), or epichlorohydrin/dimethylamine polymers; nonionic or anionic polymers, including polyethylene glycol or lignins; and any combinations thereof.

16. The system according to claim 15, wherein the base fluid comprises an electrolyte.

17. The system according to claim 16, wherein the electrolyte is selected from the group consisting of, a salt, acid or base solutions, acid precursors, and combinations thereof.

* * * * *